US005874933A

United States Patent [19]
Hirai et al.

[11] Patent Number: 5,874,933
[45] Date of Patent: Feb. 23, 1999

[54] MULTI-GRADATION LIQUID CRYSTAL DISPLAY APPARATUS WITH DUAL DISPLAY DEFINITION MODES

[75] Inventors: Hoko Hirai; Masaki Miyatake; Kenshi Tsuchiya; Seiichi Sagi, all of Yokohama, Japan

[73] Assignee: Kabushiki Kaisha Toshiba, Kawasaki, Japan

[21] Appl. No.: 519,310

[22] Filed: Aug. 25, 1995

[30] Foreign Application Priority Data

Aug. 25, 1994 [JP] Japan .................................... 6-200401

[51] Int. Cl.[6] .............................. G09G 3/36; G09G 5/10; H04N 3/14

[52] U.S. Cl. ............................ 345/89; 345/147; 348/790

[58] Field of Search ............................... 345/89, 100, 87, 345/152, 147, 1–5, 36–38, 49, 50; 348/790, 792

[56] References Cited

U.S. PATENT DOCUMENTS

| | | | |
|---|---|---|---|
| 4,779,138 | 10/1988 | Nomura et al. | 348/790 |
| 5,168,270 | 12/1992 | Masumori et al. | 348/790 |
| 5,276,436 | 1/1994 | Shaw et al. | 345/152 |
| 5,434,599 | 7/1995 | Hirai et al. | 345/100 |
| 5,546,102 | 8/1996 | Scheffer et al. | 345/87 |
| 5,642,133 | 6/1997 | Scheffer et al. | 345/147 |

FOREIGN PATENT DOCUMENTS 4-271391 9/1992 Japan .

OTHER PUBLICATIONS

Hirai et al, "Optimization of Cell Condition and Driving Method in a Van LCD for Color Video Display", Proceedings of the Socitey for Information Display, vol. 31/2, 1990, pp. 149–153.

Hirai et al, "Optimization of Cell Condition and Driving Method in a Van LCD for Color Video Display", Japan Display '89, Proceedings of the 9th International Display Research Conference, Oct. 16–18, Kyoto, pp. 184–187.

*Primary Examiner*—Jeffery Brier
*Assistant Examiner*—David L Lewis
*Attorney, Agent, or Firm*—Pillsbury Madison & Sutro LLP

[57] ABSTRACT

A multi-gradation liquid crystal display having dual display definition modes that can display both TV pictures and office automation images, both without flicker. Scanning electrodes extend in a first direction. Scanning and non-scanning voltages are selectively applied to the scanning electrodes. Signal electrodes extend in a second direction perpendicular to the first direction. First and second signal voltages are selectively applied to the signal electrodes. A layer of liquid crystal is sandwiched between the scanning and signal electrodes. Mode switching is provided for switching display between a first mode wherein an image is displayed by two-gradation pixels and a second mode wherein an image is displayed by three or more gradation pixels.

28 Claims, 17 Drawing Sheets

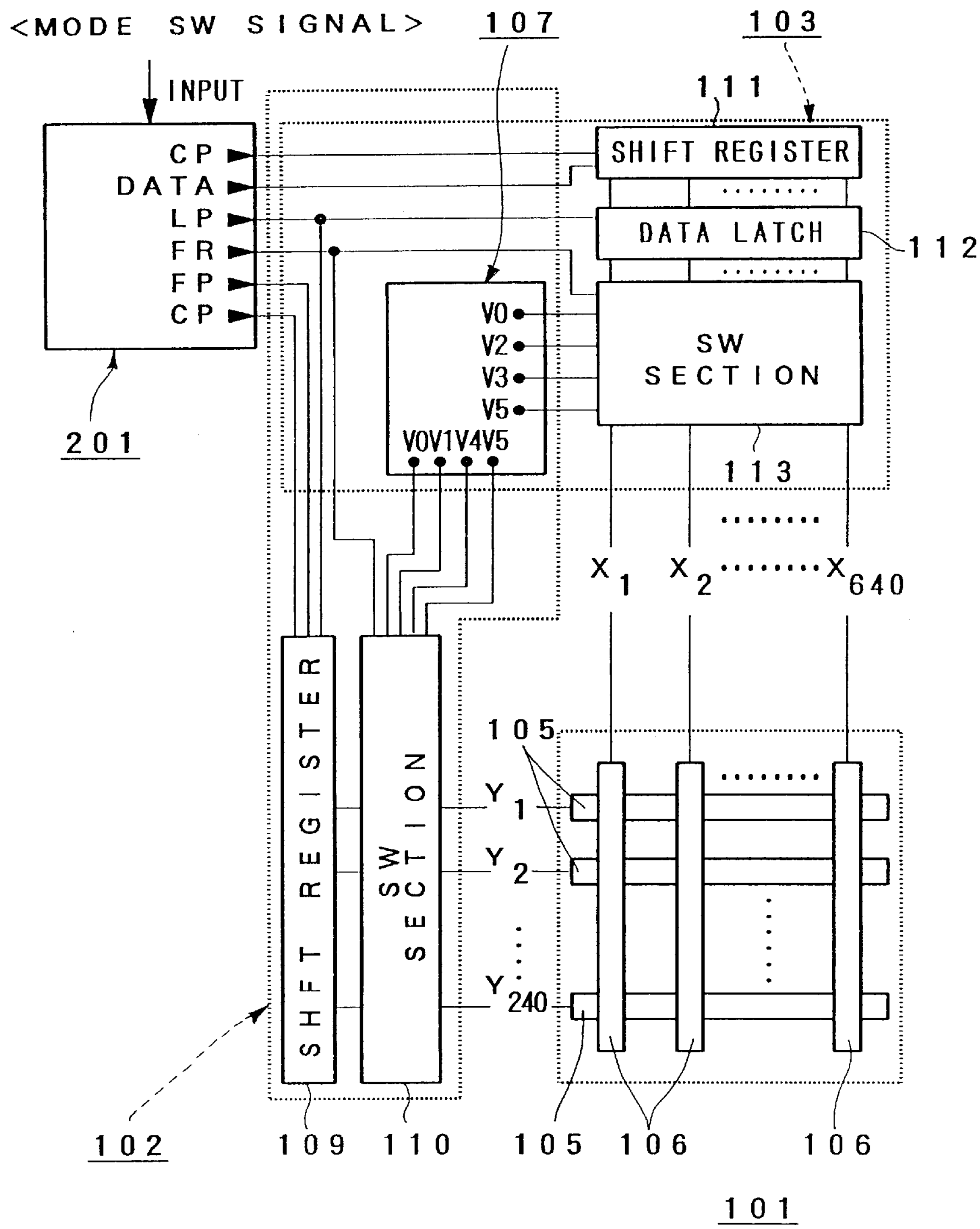
F I G. 3

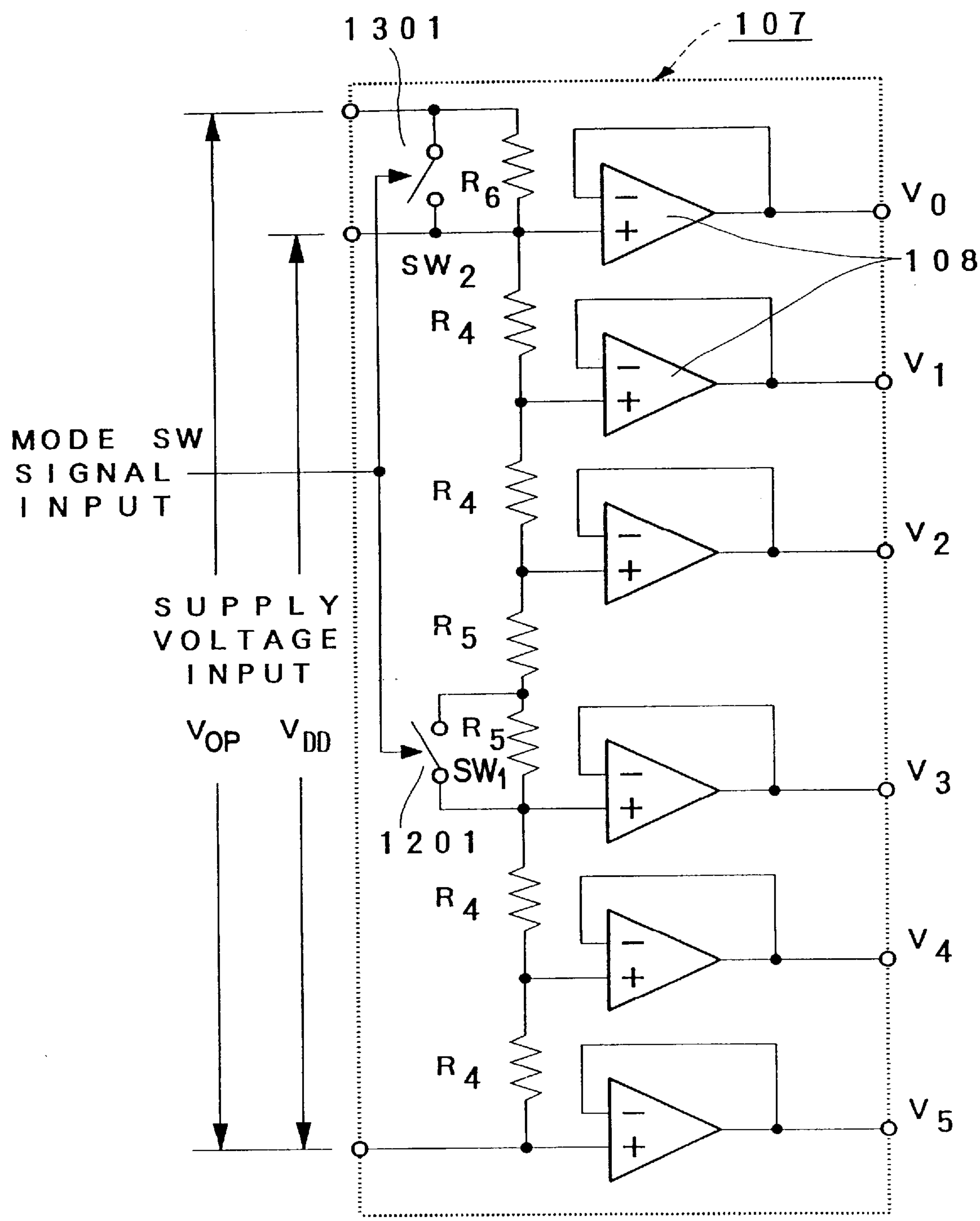
F I G. 1 3

MULTI-GRADATION LIQUID CRYSTAL DISPLAY APPARATUS WITH DUAL DISPLAY DEFINITION MODES

TECHNICAL FIELD OF THE INVENTION

The present invention relates to a liquid crystal display apparatus, and more specifically to a liquid crystal apparatus, which can selectively switch two display modes; that is, from an image displayed by a personal computer, for instance to a picture (multi-gradation representation higher in gradation than the ordinary picture) displayed by a TV, for instance or vice versa, while reducing flicker for realization of an excellent display quality.

RELATED ART OF THE INVENTION

A liquid crystal display unit has been widely used as a display unit for an office automation apparatus (e.g., word processor, personal computer, etc.) or as a TV picture display unit (e.g., pocket TV), by making the best use of its own features such as thin thickness, light weight, low power consumption, etc.

However, when used as a display unit for an office automation (OA) apparatus, in particular, a low cost is required for the liquid crystal display unit, in addition to the multi-digit display, a high quality display, etc. As the liquid crystal display unit suitable for use as described above, there has been so far known a liquid crystal display unit of simple matrix type, in particular.

Above all, in the liquid crystal display unit of STN (supper twisted nematic) type, since the multi-digit display can be realized and further since the manufacturing cost thereof is low due to a simple structure, the number of pixels of 640×480 dots (VGA) or 640×400 dots is widely used as a display unit for OA apparatus (e.g., personal computers) which require a lower cost.

On the other hand, in the case of the liquid crystal display unit widely used for personal TVs put on the market, since the high quality picture is required at a severer low cost, a simple structure and a high production yield are both needed. In the field of the above-mentioned use, therefore, the liquid crystal display unit of simple matrix type is suitable.

Further, in the case of the liquid crystal display unit used to display motion pictures which require a gradation representation as with the case of a personal TV, a TN (twisted nematic) type liquid crystal display element (panel) is widely used because of its high response speed. In this case, the number of pixels is about 320×220 dots, and the size of screen is relatively small (e.g., 6 inch or less).

Recently, however, there exists such a need of realization of a liquid crystal display unit which can be used as display units of both the above-mentioned personal OA apparatus and the personal TV. In other words, there is a need of such a liquid crystal display unit which can display TV pictures on the same screen when the OA apparatus is not used.

In the liquid crystal display unit usable for both the uses as described above, it is necessary that the display unit can cope with the video data of both the OA apparatus and the TV.

However, in the conventional STN type liquid crystal display module used as a display unit for a data processor such as the personal OA apparatus, in general, the display unit is so constructed as to correspond to the binary representation such that an image is displayed by turning each pixel on or off to display black or white.

Therefore, in order to display TV pictures (which require a multi-gradation representation) on the STN type liquid crystal display unit widely used for the personal OA apparatus, it has been necessary to incorporate an additional exclusive circuit for realization of the gradation representation, in the liquid crystal display module. In this case, however, there exists a problem in that the display capacity (the number of pixels) for displaying pictures of a TV is different from that for displaying images of an OA apparatus.

In addition, in order to display a multi-gradation picture on the relatively low-costly liquid crystal display unit of simple matrix type, since it is difficult to use the AM (amplitude modulation) method, PHM (phase modulation) or PWM (pulse width modulation) method, a FRC (frame reduction) method is generally adopted. However, when multi-gradation pictures are displayed on the liquid crystal display unit of simple matrix type in accordance with the frame reduction method, there arises a problem in that the displayed picture flickers frequently due to the status changes of the liquid crystal cells for each frame, so that the display quality deteriorates.

Therefore, when two different display sorts or modes are required to be selectively displayed on the same single liquid crystal display unit by switching the modes, the liquid crystal driver circuit must be formed in accordance with the number of gradations required for any one of the two display modes. In the case where the above-mentioned circuit is incorporated, there arises another problem in that the structure of the liquid crystal driver circuit is extremely complicated. For instance, although a V-RAM is now used as a memory for storing video data in the conventional liquid crystal driver circuit system, two V-RAMs must be provided for each of these two display modes one by one in the liquid crystal display unit. As a result, another problem arises in that it is difficult to realize a small-sized and low-costly liquid crystal display unit.

Further, when the conventional multi-gradation representation method (frame reduction method) is used without changing the above-mentioned method, the displayed picture flickers frequently.

Further, since the gradation representation function must be added to the liquid crystal module itself; that is, since another exclusive gradation representation circuit must be used as the driver IC for driving the liquid crystal display unit, there exists a problem in that the display unit cost (i.e., the product cost) increases.

SUMMARY OF THE INVENTION

The present invention has been made to solve the above-mentioned problems, and the object of the present invention is to provide a liquid crystal display apparatus, which can display images or pictures on both the OA apparatus an the TV by use of extremely simple and low-costly means in a high quality without flickers.

The present invention provides a liquid crystal display apparatus, comprising: a plurality of scanning electrodes extending in a first direction, scanning voltage and non-scanning voltage being selectively applied thereto; a plurality of signal electrodes extending in a second direction perpendicular to the first direction, first signal voltages and second signal voltages being selectively applied thereto; a liquid crystal layer sandwiched between said scanning electrodes and said signal electrodes; mode switching means for switching a first mode in which an image is displayed by two-gradation pixels to a second mode in which a picture is displayed by three or more gradation pixels or vice versa; scanning voltage applying means for selectively applying the scanning voltage and the non-scanning voltage to each of said scanning electrodes; in the first mode, the scanning voltage being applied to a plurality of said scanning electrodes one by one in sequence only during a first period; and in the second mode, the scanning voltage being applied to M-lines of a plurality of said scanning electrodes simultaneously in sequence during a second period M-times longer than the first period; and signal voltage applying means for selectively applying the first signal voltage and the second signal voltage to each of said signal electrodes; in the first mode, any one of the first signal voltage and the second signal voltage being applied to each of said signal electrodes only during the first period; and in the second mode, any one of the first signal voltage and the second signal voltage selected for each first period being applied during the second period, M-times in total.

BRIEF DESCRIPTION OF THE DRAWINGS

FIG. 3 is a circuit block diagram showing an entire circuit construction of the liquid crystal display apparatus according to the present invention;

FIG. 13 is a circuit diagram showing liquid crystal drive voltage generating circuit used for a sixth embodiment of the liquid crystal display apparatus;

DETAILED DESCRIPTION OF EMBODIMENTS

Figure 1:
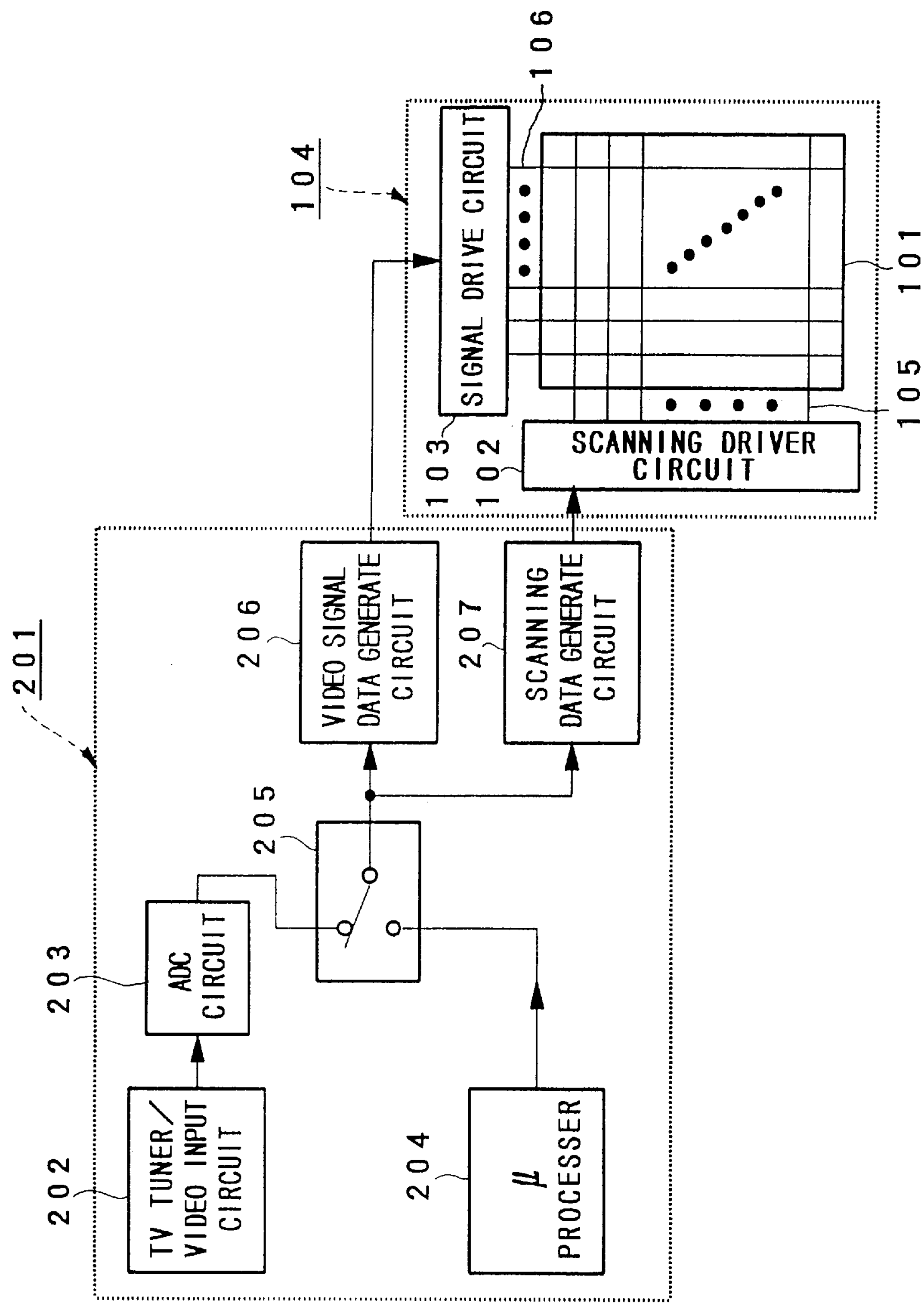
FIG. 1 is a schematic block diagram showing a first embodiment of the liquid crystal display apparatus according to the present invention.

In the liquid crystal display apparatus according to the present invention, a liquid crystal drive circuit system is formed in such a way that the first mode (for displaying images as a display unit for an OA apparatus or for a display terminal) and a second mode (for displaying pictures represented by multi-gradation representation as a display unit for a TV) can be selectively switched. Basically, the simple matrix-type liquid crystal display element (i.e., panel) formed in correspondence to binary representation can be used to display high-quality images or pictures in both the first mode and the second modes by an excellent multi-gradation reproducibility without flickers.

In the liquid crystal display apparatus according to the present invention, in spite of the fact that the liquid crystal element formed in correspondence to the binary display are used, in the second mode, the display apparatus can be driven by a novel driving method according to the present invention, which is different from the conventional gradation representation methods (such as the area gradation representation method, the voltage amplitude modulation method, the voltage pulse width modulation method, or the frame reduction method).

In more detail, in the second mode of the liquid crystal display apparatus according to the present invention, the scanning data generating circuit forms scanning data for generating scanning voltage waveforms such that M-lines of mutually adjacent scanning electrodes can be selected for scanning at the same time for each N scanning select periods (M>N) so as to be shifted N lines by N lines of the scanning electrodes. The generated scanning data are supplied to the scanning driver circuit.

On the other hand, the video signal data generating circuit applies gradation video signal voltages of digital format to the liquid crystal cells for each scanning period, to generate video signal data for executing gradation representation on the basis of averaged values during the N scanning select periods. The generated video signal data are supplied to the signal driver circuit.

The scanning driver circuit selects the N-lines of the scanning electrodes mutually adjacent to each other together and simultaneously during the scanning select period. In other words, the scanning pulses are applied to the N-lines of adjacent scanning electrodes at the same time to set these electrodes to the select status simultaneously. On the other hand, on each signal electrode side, the video signal voltage is formed in such a way that the gradation representation can be executed in accordance with the average value of the turn-on status signal electrodes during the above-mentioned M scanning select period, on the basis of the video signal data supplied by the signal driver circuit. The formed video signal voltages are applied to the signal electrodes, respectively. At this time, the liquid crystal application voltage applied to the respective intersection pixels between the M-lines of the scanning electrodes set to the above-mentioned scanning select status and the respective signal electrodes are the averaged voltages applied during the M scanning select periods. Accordingly, it is possible to display a picture having (M+1) gradation representation including the perfectly turn-on status and the perfectly turn-off status.

Further, in the present invention, since M-lines of the mutually adjacent scanning electrodes are selected at once together for scanning, this is equivalent to the fact that the number of scanning lines is reduced, as compared with the first mode, so that the response speed of the liquid crystal pixels can be substantially increased. The same effect can be obtained when the scanning (such that M-lines of the mutually adjacent scanning electrodes are set to the scanning select status at once together) are executed by shifting the scanning lines N lines by N lines in sequence for each N scanning select periods (M>N). Further, the same effect can be obtained when the scanning lines are shifted M lines by M lines in sequence for each M scanning select periods.

Consequently, the liquid crystal display apparatus according to the present invention is suitable when high response speed is required and when motion pictures are required to be displayed on a screen of a TV whose number of scanning lines is smaller that of the display unit of the OA apparatus. In other words, in the case where the number of scanning electrodes of the used liquid crystal display elements is different from the number of the effective scanning lines of the TV video signals, when the above-mentioned M or N is set to an appropriate value, it is possible to execute the scanning suitable for the number of the effective scanning lines of the TV picture.

In addition, according to the present invention, in particular, since the scanning is executed in such a way that M-lines of mutually adjacent scanning electrodes are set to the scanning select status at once together and further the scanning electrodes set to the selected status can be shifted N lines by N lines in sequence for each N scanning select periods, it is possible to smoothen the change in the turn-on or -off status of the pixels of each of the adjacent scanning lines for each adjacent (both before and after) scanning select period. In other words, when the condition M>N is set, (M–N)-lines of the scanning electrodes are selected being overlapped for each scanning select period. That is, since the select status of the scanning electrodes is shifted in sequence for each scanning select period, it is possible to extremely smoothen the change in luminance between the pixels selected for each frame period, that is, the change in luminance within one picture.

Further, in the frame reduction display method, flickers occur frequently. In the present invention, however, it is possible to effectively eliminate the flickers, so that it is possible to display a high-quality picture of less flickers.

By the way, in the second mode, since the above-mentioned M-lines of the scanning electrodes are selected at once simultaneously for each scanning select period as described above, as compared with the first mode (such that each scanning electrode is simply selected line by line in sequence for scanning), the duty factor of the liquid crystal element increases substantially.

Therefore, when the second mode is selected, the liquid crystal driving voltage waveform must be optimized according to the value of M.

Here, when the crest (peak) value (absolute value) of the scanning voltage waveform is defined as A and the crest value (absolute value) of the signal voltage waveform is defined as B, (A+B) is defined as the liquid crystal drive voltage $V_{OP}$. Further, the B/(A+B) is defined as a bias ratio 1/b.

First, if the $V_{OP}$ obtained when the second mode is selected is determined lower than the $V_{OP}$ obtained when the first mode is selected, the change in the effective value of the liquid crystal application voltage due to change in the drive duty factor is equalized between the two modes. Further, when the bias ratio 1/b obtained when the second mode is selected is determined lower than that obtained when the first mode is selected, the effective value of the liquid crystal application voltage is equalized between the two modes. As a result, it is possible to uniformalize the luminance and contrast characteristics of the displayed picture.

Further, it is preferable that the bias ratio of the above-mentioned video signal voltages is controlled to an optimum theoretical value, respectively in both first and second modes.

The theoretical optimum value of the bias ratio is $1/(L^{1/2}+1)$ in the first mode and $1/\{(L/M)^{1/2}+1)$ in the second mode. By setting the bias ratio as described above in each mode, it is possible to maximize the ratio (Vs/Vns) in both the first and second modes, respectively, where Vs denotes the effective value for turning on the liquid crystal element and Vns denotes the effective value for turning off the liquid crystal element. Therefore, when the bias ratio is set as describe above, it is possible to obtain the maximum contrast and luminance in each mode, theoretically. Although the theoretical optimum values of the above-mentioned bias ratios can be decided as described above, however in practice, it is desirable to set these ratios within a tolerance $\pm\alpha=45\%$. This is because the liquid display element must be adjusted within this range according to the specifications of the used liquid crystal display panel. The liquid crystal display panel is provided with an electrostatic capacity different according to the used liquid crystal material, panel size, panel gap, etc. Therefore, a uniform display can be obtained when the difference between the liquid crystal display panels is adjusted by changing the bias ratio.

The embodiments of the liquid crystal display apparatus according to the present invention will be described hereinbelow with reference to the attached drawings.

(First embodiment)

FIG. 1 is a simplified illustration showing the schematic construction of the first embodiment of the liquid crystal display apparatus according to the present invention. The liquid crystal display apparatus comprises a liquid crystal module 104 and a data generating circuit 201 for supplying scanning data and video data for displaying an image or a picture on a display element of the liquid crystal module 104. The liquid crystal module 104 is composed of a liquid crystal display element 101, a scanning driver circuit 102 and a signal driver circuit 103 both for driving the liquid crystal display element 101. The data generating circuit 201 is provided with a TV tuner/video input circuit 202 for generating gradation-representation video data of analog type gradation representation and so-called TV video signals; an ADC circuit 203 for converting the video signals supplied from the TV tuner/video input circuit 20 from analog signals to digital signals; a microprocessor 204 (e.g., microcomputer or word processor) for generating image data; a mode switch circuit 205 for selecting any one of the outputs of the TV tuner/video input circuit 202 and the microprocessor 204; a video signal data generating circuit 206 for generating video signal data on the basis of the data supplied through the mode switch circuit 205; and a scanning data generating circuit 207 for generating scanning data.

The data generating circuit 201 selects any one of gradation-representation video data of analog format (i.e., TV video signals for displaying TV pictures) outputted by the TV tuner/video input circuit 202 and character image data of digital format (i.e, numerals and letters outputted by the microprocessor 204 for forming images of a computer or a word processor, via the mode switch circuit 205. As described above, the data generating circuit 201 is provided with a function for switching the first mode (for displaying the computer image) to the second mode (for displaying the TV picture) or vice versa.

When the first mode is selected, data are supplied from the microprocessor 204 to the video signal data generating circuit 206 and the scanning data generating circuit 207 via a data bus. On the basis of the supplied data, the video signal data generating circuit 206 and the scanning data generating circuit 207 generate the video signal data and the scanning data, respectively. Further, the generated video signal data are supplied to the signal driver circuit 103, and the scanning data are supplied to the scanning driver circuit 102, respectively.

On the basis of the supplied scanning data, the scanning driver circuit 102 applies the scanning select voltage to the scanning electrodes selected from among all the scanning electrodes 105 only during the scanning select period.

On the other hand, on the basis of the supplied video data, the signal driver circuit 103 applies the signal voltages to the respective signal electrodes 106 in synchronism with the scanning voltages. That is, when the scanning voltage and the signal voltage are superposed upon each other, as the liquid crystal application voltage, in the liquid crystal display element 101, the liquid crystal cells are driven for each pixel to display an image of the microcomputer or a word processor on the liquid crystal display element 101.

On the other hand, when the second mode for displaying TV pictures is selected by the mode switch circuit 205, the analog data generated by the TV tuner/video input circuit 202 are converted from analog signals to digital signals by the ADC circuit 203, and then supplied to the video signal data generating circuit 206 and the scanning data generating circuit 207, respectively via the data bus.

In this case, the scanning data generating circuit 207 generates such scanning data that M-lines of the mutually adjacent scanning electrodes can be set to the scanning select status simultaneously in such a way that M scanning electrodes to be set can be shifted N lines by N lines for each N horizontal periods (M>N). The generated scanning data are supplied to the scanning driver circuit 102. On the other hand, the video signal data generating circuit 206 generates the video signal data for displaying a picture on the basis of averaged gradation representations during the M scanning select periods. The generated signals are supplied to the signal driver circuit 103. On the basis of the supplied scanning data and the video data, the scanning driver circuit 102 and the signal driver circuit 103 form the scanning voltages and the signal voltages, respectively, and apply the formed voltages to the scanning electrodes 105 and the signal electrodes 106, respectively. As described above, the liquid crystal display element 101 is driven to display a picture represented by averaged gradation representations in the turned-on status of the respective pixels during the M scanning select periods.

The construction and the operation of the first embodiment of the liquid crystal display apparatus according to the present invention have been roughly described above. Then, the more detailed construction and operation will be explained hereinbelow.

Here, it is also possible to arrange the TV tuner/video input circuit 202 and the microprocessor 204 outside the liquid crystal display apparatus according to the present invention and to supply the analog data and the digital data from the externally arranged TV turner or through a data bus of another microcomputer to the liquid crystal display apparatus according to the present invention.

Figure 2:
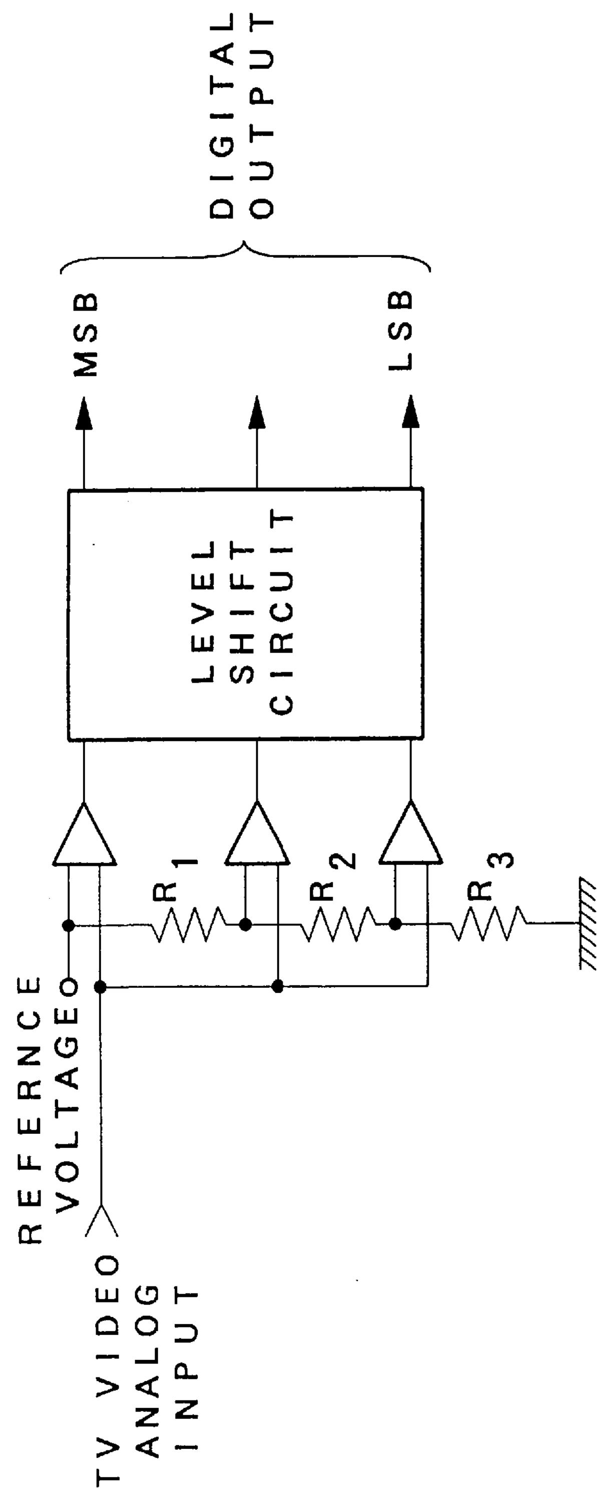
FIG. 2 is a circuit diagram showing an ADC circuit shown in FIG. 1.

The ADC circuit 203 converts the input analog data (analog format) into the digital data (digital format). Therefore, the conventional AD converter can be of course used. However, it is desirable to use an AD converter as shown in FIG. 2 in this embodiment. In the AD converter circuit shown in FIG. 2, the analog video signals inputted by the TV/video input circuit 202 are converted into digital signals in the order of the magnitude of the video voltages, and then outputted after having been allocated to the respective stage voltages from the LSB (least significant bit) to MSB (most significant bit). The circuit as described above is provided with such a feature that the circuit construction is extremely simple and therefore low in cost. Further, when this circuit is used, the video data generating circuit can be replaced with a frame memory or a simple circuit for rearranging data.

The mode switching circuit 205 is a select circuit for selecting any one of the data inputted from the TV tuner/video input circuit 202 via the ADC circuit 203 and the binary image data supplied from the microprocessor 204 via the same ADC circuit 203. Therefore, any circuit can be used as far as the circuit is provided with a switching function. Further, the mode switching circuit 205 is activated in response to a mode switch signal inputted thereto, or else a mechanical switch can be also used.

The video signal data generating circuit 206 is mainly composed of a frame memory (not shown) having the address corresponding to the number of pixels of the liquid crystal display element 101 and a timing circuit (also not shown) for controlling data write/read in and from the frame memory. The timing circuit writes the A-D converted data in the frame memory and then read from the frame memory to supply the read data to the signal driver circuit 103 of the liquid crystal module 104.

On the other hand, the scanning data generating circuit 207 generates the scanning data for deciding the canning select status of the scanning electrodes 105 in synchronism with the timing signals, and supplies the generated scanning data to the scanning driver circuit 102.

FIG. 3 is an illustration showing the simplified construction of the liquid crystal module 104.

As shown in FIG. 3, the liquid crystal display element 101 is formed into such a structure that the scanning electrodes 105 and the signal electrodes 106 are arranged into a matrix pattern so as to be opposed to each other, and a liquid crystal composite (not shown) (ZLI-2293 by Merku Corp.) is interposed in a gap formed between the two electrodes 105 and 106. In this embodiment, STN type liquid crystal display element is used. The display is of A4 size and the display capacity (the number of pixels) is 640×480 dots. Further, the cell gap of this STN liquid crystal display element is about 7 $\mu$m. The liquid crystal display element is provided with an orientation film formed of polyimide and processed for rubbing orientation, and the liquid crystal molecules are twisted by 240 degrees within the cell. Further, the scanning electrodes 105 and the signal electrodes 106 are both formed of an ITO transparent electrode material. Further, in order to eliminate color produced when the STN liquid crystal is displayed monochromatically (black and white), optical phase compensation cells are pasted on the liquid crystal display element 101. Further, the liquid crystal cells are so set that when no voltage is applied, black is displayed, and when the two voltages are applied, white is displayed.

Figure 4:
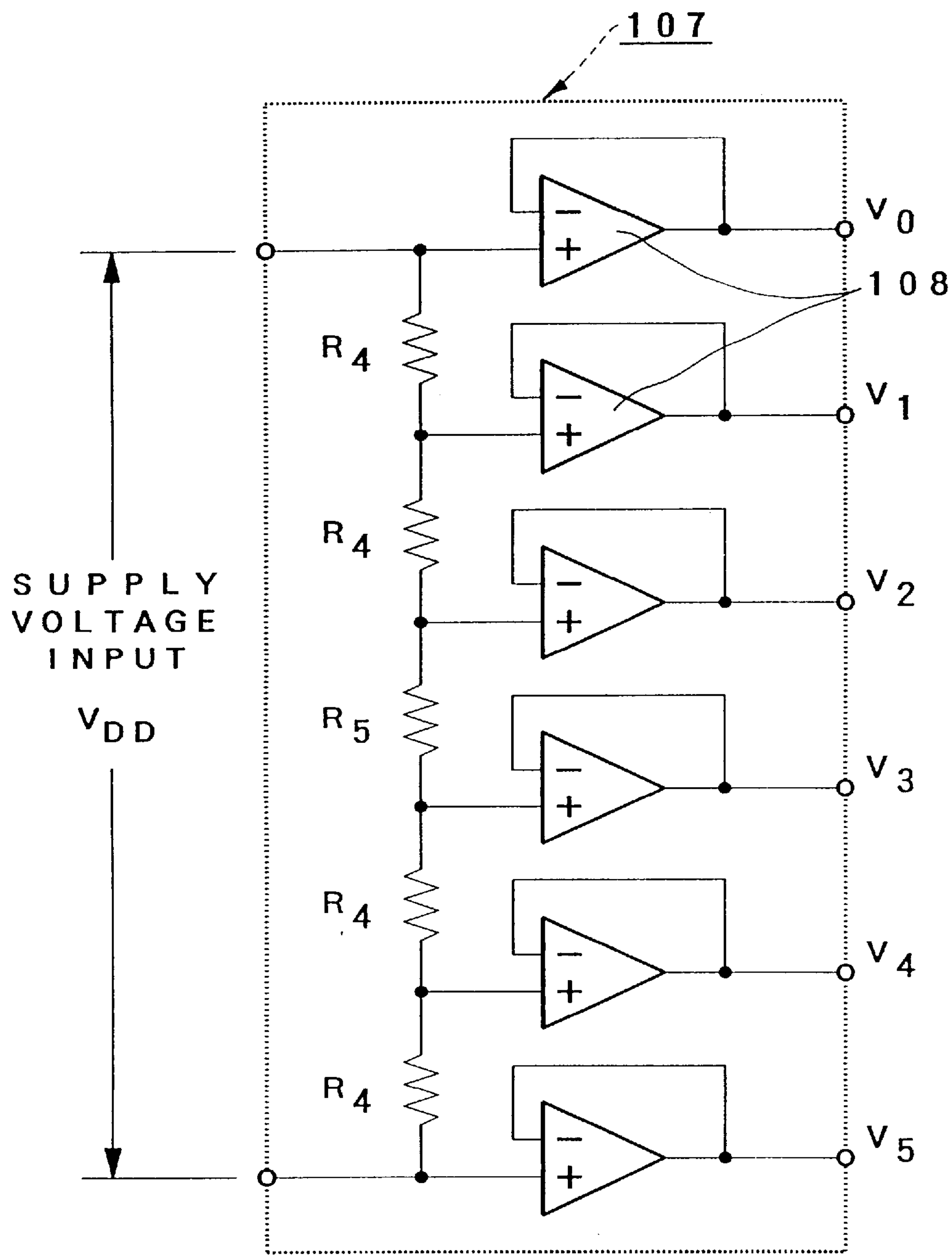
FIG. 4 is a circuit diagram showing a liquid crystal drive voltage generating circuit of the first embodiment of the liquid crystal display apparatus.
Figure 5A:
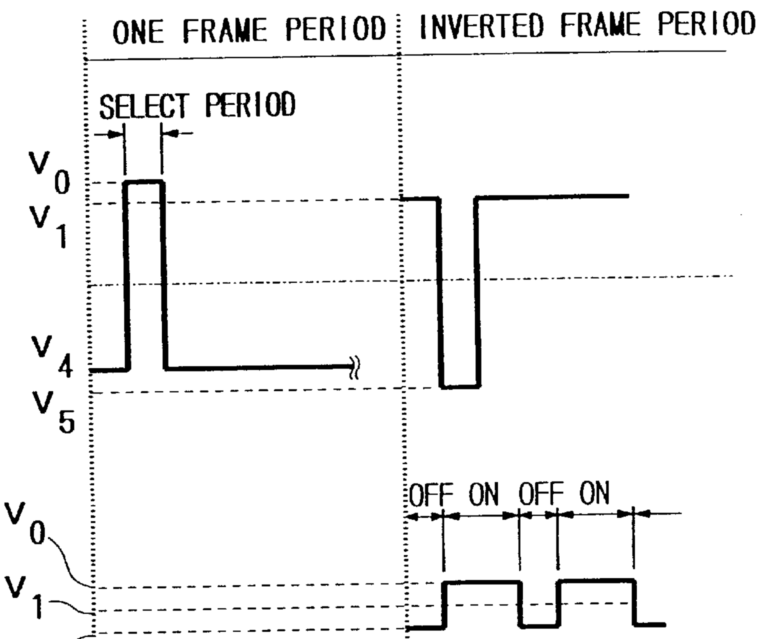
FIGS. 5(*a*), 5(*b*) and 5(*c*) are waveform diagrams each showing examples of the scanning voltages and the signal voltages in the first mode.
Figure 5B:
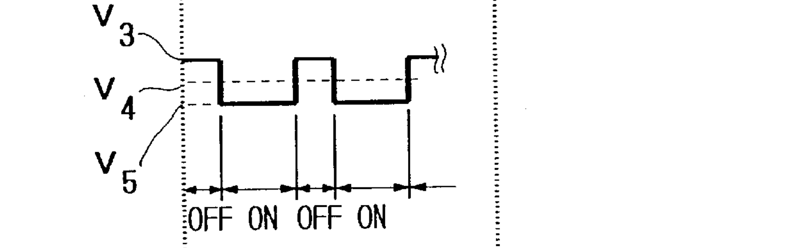
Figure 5C:
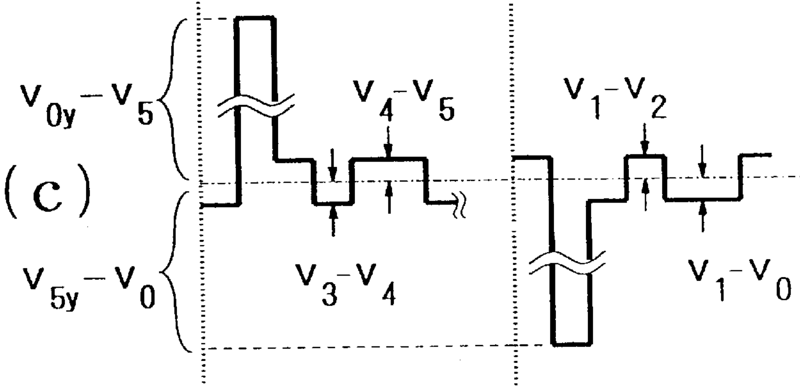

The scanning driver circuit 102 forms four scanning voltages of four potentials V0, V1, V4 and V5 on the basis of the scanning data. Further, the signal driver circuit 103 forms four signal voltages of four potentials V0, V2, V3 and V5 on the basis of the video signal data. These potentials from V0 to V5 can be obtained by dividing an input dc supply voltage $V_{DD}$ by the liquid crystal voltage generating circuit 107 having a voltage divider circuit, as shown in FIG. 4. In this liquid crystal drive voltage generating circuit 107, an input supply voltage $V_{DD}$ is divided by electric resistors R4 and R5 to generate the potentials V0 to V5, and these potentials are outputted via a buffer 108, respectively. As already explained, V0, V1, V4 and V5 of these output potentials are supplied to the scanning driver circuit 102, and V0, V2, V3 and V5 of these output potentials are supplied to the signal driver circuit 103, respectively. These output potentials of V0, V1, V2, V3, V4 and V5 are applied to the liquid crystal display element 101 as the liquid crystal application voltages having the waveforms as shown in FIG. 5.

In response to the scanning control signal (FP: frame pulse) outputted by the data generating circuit 201, the scanning driver circuit 102 selects potentials corresponding to the scanning data from the potentials (V0, V1, V4 and V5), and applies the selected potentials to the 240 scanning electrodes 105 from Y1 to Y240.

As shown in FIG. 3, the essential portion of the scanning driver circuit 102 is composed of a shift register latch 109 for transferring the scanning data in sequence internally; and a switch section 110 for selecting the scanning pulses V0 and V5 (in polarity inversion) or the potential V4 and V1 (in polarity inversion) under control of the shift register latch 109.

When receiving the FP (frame pulse) as the basic scanning data, the shift register latch 109 transfers the scanning data from Y1 to Y240 to the 240 register elements (not shown) in sequence in response to a clock CP', and further outputs the output voltages from Y1 to Y240 in response to the latch pulse signal LP. The same operation as described above is executed when the second mode is selected.

Inside the switch section 110, switch elements (not shown) connected one by one to each of the 240-lines of the scanning electrodes 105 are arranged in a line. Each of these switch elements is switched on the basis of the scanning data transferred one by one from the 240-lines of the register elements arranged in the shift register latch 109. In other words, when the scanning data inside the respective shift register latch 109 are [select data], each switch element of the switch section 110 selects the potential V0 or V5 (in polarity inversion) and outputs the selected potential to the scanning electrodes 105. Further, when the scanning data inside the respective shift register latch 109 are [non-select data], each switch element of the switch section 110 selects the potential V4 or V1 (in polarity inversion) and outputs the selected potential to the scanning electrodes 105. That is, the scanning voltages as shown in FIG. 5(*a*) are applied to the scanning electrodes 105.

On the other hand, on the basis of the video signal data outputted from the video signal data generating circuit 206, the signal driver circuit 103 selects the potentials corresponding to the video signal data from among the potentials V0, V2, V3, and V5, and applies the selected signal voltages to the 640-lines of the signal electrodes 106 from X1 to X640. As shown in FIG. 3, the essential portion of the signal driver circuit 103 is composed of a shift register 111 in which register elements (not shown) are arranged in a line to transfer video signal date in sequence; a data latch 112 for holding the video signal data transferred in sequence at predetermined timings in parallel status; and a switch section 113 for selecting the output potentials on the basis of the held video data.

In response to the video signal data (referred to as DATA, hereinafter), the shift register 111 transfers DATA corresponding to the signal electrodes 106 (X1 to X640) to the respective register elements in sequence in response to the clock pulse (CP) for transferring DATA. Further, in response to the latch pulse (LP), the data latch 112 holes DATA corresponding to all the signal electrodes 106 from X1 to X640 in parallel. On the basis of the held DATA, the switch section 113 selects the select voltage V5 when DATA selects the on-status, but V0 when the polarity is inverted. Further, the switch section 113 selects the select voltage V3 when the DATA selects the off-status, but V2 when the polarity is inverted. As described above, the video signal voltages as shown in FIG. 5(*b*) are applied to the respective signal electrodes 106.

When the scanning voltages are applied to the scanning electrodes 105 and the signal voltages are applied to the signal electrodes 106 as described above, the voltage waveforms applied to the liquid crystal layer (not shown) sandwiched at the intersections between the scanning electrodes 105 and the signal electrodes 106 become the liquid crystal application voltages as shown in FIG. 5(*c*) by way of example. In FIG. 5(*c*), although the polarity of the waveform is inverted for each frame for only explanation, in general, the polarity of the waveform is inverted during 10 to 20 scanning periods.

The polarity inversion driving method is one of the driving method of applying an ac liquid crystal application voltage to the liquid crystal layer in order to prevent the liquid crystal composite from being degraded due to the continuous application of dc voltage component. That is, the switch section 110 of the scanning driver circuit 102 and the switch section 113 of the signal driver circuit 103 are controlled by the polarity inversion signal (FR) so that the polarity thereof can be inverted during a predetermined period.

Figure 6:
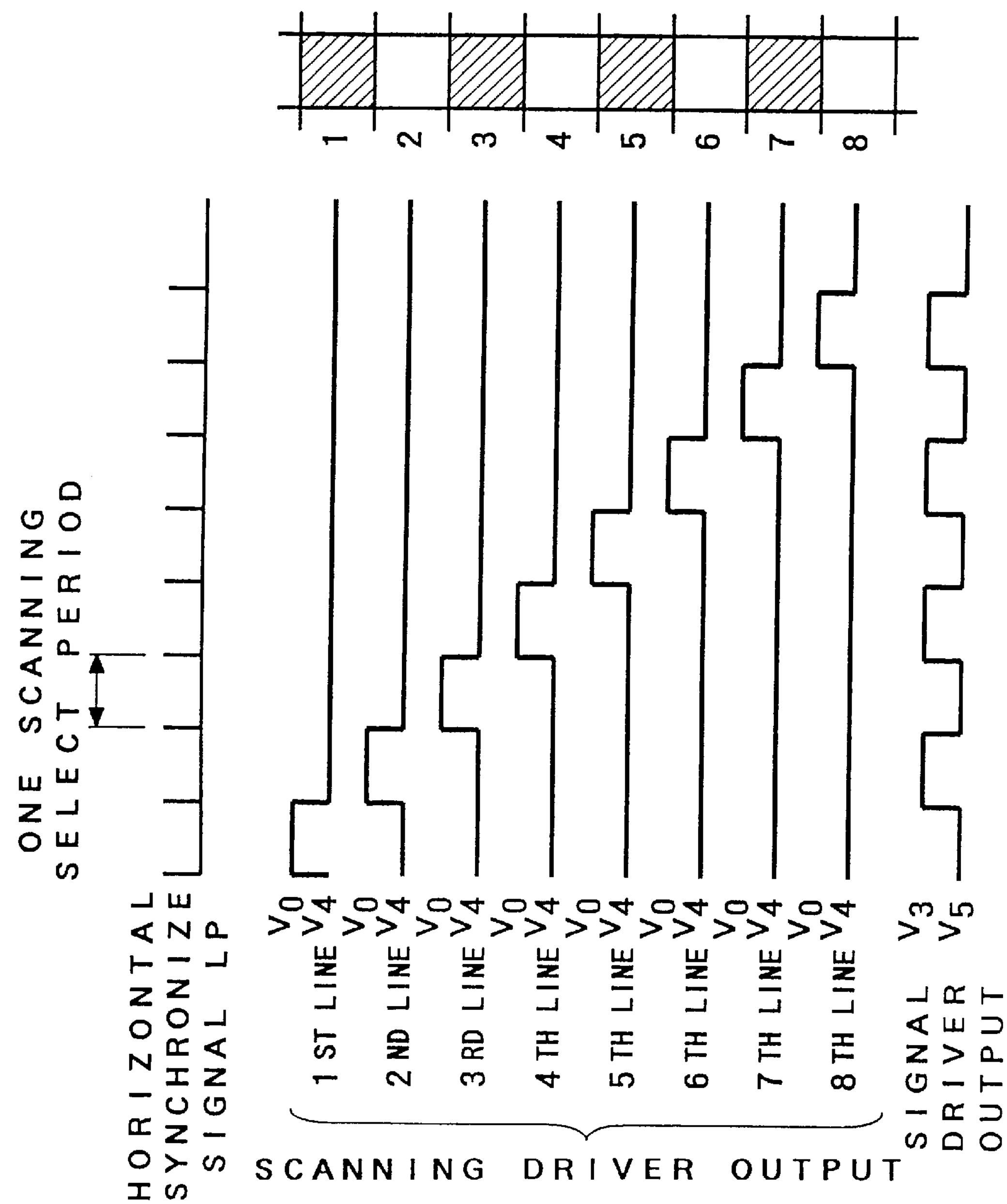
FIG. 6 is a timing chart showing examples of the scanning voltage waveforms and the signal voltage waveform for displaying a binary represented image in the first mode.
Figure 7:
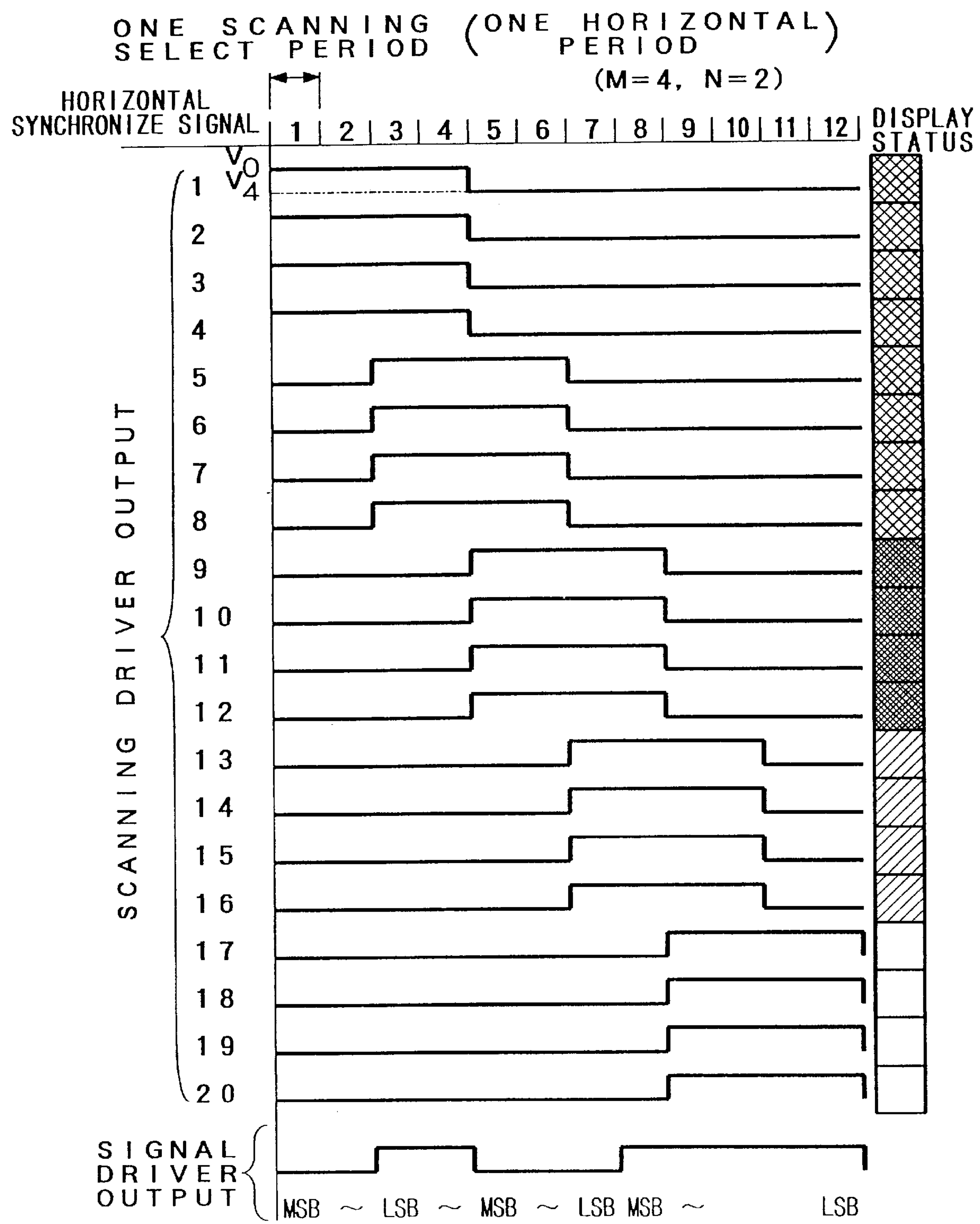
FIG. 7 is a timing chart showing examples of the scanning voltage waveforms and the signal voltage waveform for displaying a gradation picture on the basis of average voltages during M-scanning select period for each pixel in the second mode.

The waveforms of the scanning voltages formed by the scanning driver circuit 102 and the waveforms of the video signal voltages formed by the signal driver circuit 103 in the first mode are both shown in FIG. 6, by way of example. Further, the same waveforms in the second mode are shown in FIG. 7, by way of example. In FIGS. 6 and 7, only one polarity side of each of the output waveforms (during one frame period) is shown for brevity.

In the first mode, as shown in FIG. 6, the scanning electrodes 105 are scanned one line by one line in line sequence. In synchronism with this, when the scanning line is selected, V5 is supplied to the signal electrodes 106; and when not selected, V3 is supplied thereto. In the example shown in FIG. 6, a white and black image can be displayed, as shown on the right side in the same drawing. The binary display as described above is suitable for displaying an image such as characters (e.g., numerals, letters, etc.) in the data processor such as a personal computer or a word processor. Further, this binary display is suitable for executing gradation representation on the basis of the frame reducing method.

On the other hand, in the second mode, as shown in FIG. 7, the scanning data are supplied to the scanning driver circuit 102 so that M-lines of mutually adjacent scanning electrodes 105 can be set to the scanning select status at once together for each M scanning select periods in sequence in such a way that the set M scanning electrodes 105 can be shifted N lines by N lines for each N scanning select (i.e., horizontal) periods. In this embodiment, as shown in FIG. 7, M=4 and N=2. Further, the video signals are supplied to the signal electrodes for each scanning select period.

Figure 8:
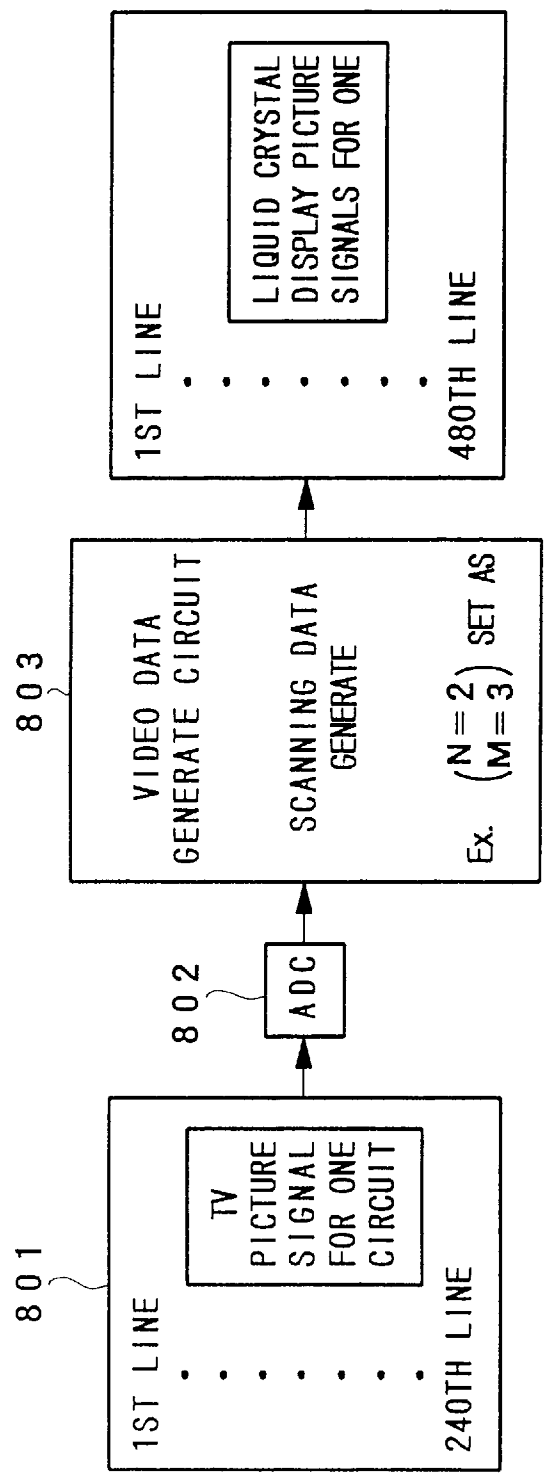
FIG. 8 is a simplified illustration showing the processing flow of the scanning data in the second mode.

FIG. 8 shows a processing flowchart for supplying the video signals in the second mode. The TV video signals for one field (one picture can be of course formed by two frames) supplied by the TV tuner/video input circuit 202 as shown in step 801 are A-D converted as shown in step 802, and then supplied to the video signal data generating circuit 206 and the scanning data generating circuit 207 via a data bus in FIG. 1. In the video signal data generating circuit 206 and the scanning data generating circuit 207, as shown in step 803, the number (M) of the simultaneous select lines by the scanning electrodes 105 (i.e., the M frames in unit scanning time) and the scanning shift intervals N are both determined. As described above, M-lines of the mutually adjacent scanning electrodes 105 are selected at the same time and set together into the simultaneous selected status. Further, in this case, since the video signal voltages are supplied being divided into M times for each scanning select period, the difference between the voltages applied to the scanning electrodes 105 and the signal electrodes 106 are applied to the liquid crystal. As a result, the liquid crystal application voltage to be applied to the liquid crystal cell for constituting each pixel is an average value obtained during the M scanning select periods for each M scanning select periods. In this embodiment, these numbers are set as M=4 and N=2, as already described above.

The picture displayed by the voltage waveforms formed as described above in the second mode are a multi-gradation picture.

In addition, since the scanning is determined such that four mutually adjacent scanning electrodes 105 are set to the scanning select status at the same time over the four scanning select periods in such a way that the set scanning select status is shifted in sequence for each two scanning select periods, the (M–N) lines of scanning electrodes 105 are selected being overlapped with one another for each scanning select period. Therefore, in one picture formed by one frame (obtained after one scanning period), the change in luminance is extremely smoothened between the adjacent pixels for each frame. As a result, it has become possible to smoothly display TV pictures required to be displayed in multi-gradation representation, by use of the liquid crystal display element (which can originally display an image of only binary representation).

As described above, in the liquid crystal display apparatus according to the present invention, it is possible to switch the first mode for displaying image data of the data processor (OA apparatus) such as a personal computer to the second mode for displaying TV pictures or vice versa.

In addition, the feature of the liquid crystal display apparatus according to the present invention is that the multi-gradation representation can be realized by only adding an extremely simple circuit to the most general liquid crystal display element of basic design for displaying only binary representation (black and white).

(Second embodiment)

The features of this second embodiment is to modify the circuit construction of the scanning data generating circuit 207, the scanning driver circuit 102, the video signal data generating circuit 206 and the signal driver circuit 103 of the first embodiment so as to correspond to M=N=2. The structure and the function of the other sections are the same as with the case of the first embodiment. Further, the same reference numerals have been retained for the similar elements which have the same functions as with the case of the first embodiment, in the description of this second embodiment and in FIG. 9 for brevity.

In this second embodiment of the liquid crystal display apparatus, the first mode display is executed by the liquid crystal application voltage quite the same as with the case of the first embodiment.

Figure 9:
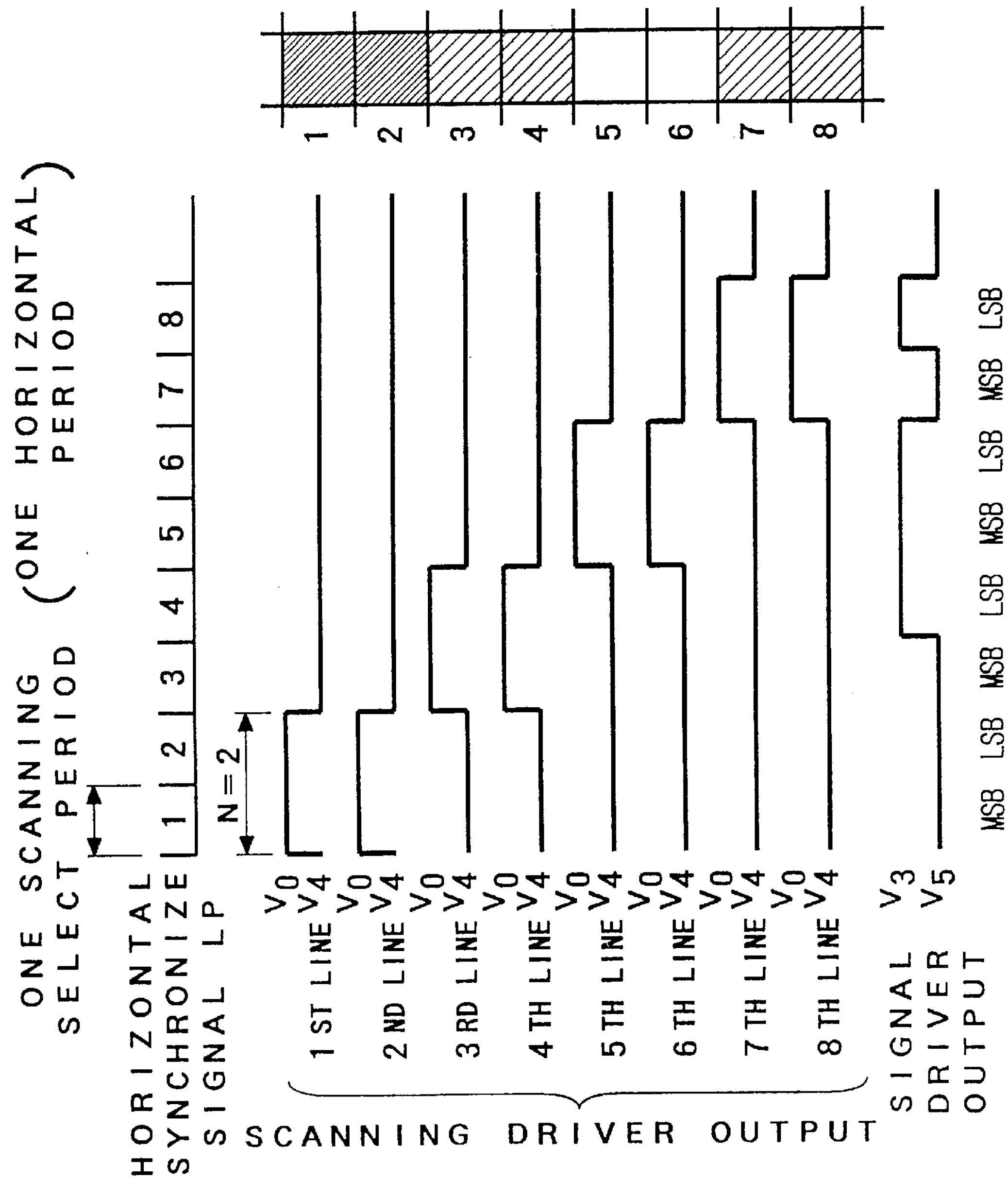
FIG. 9 is a timing chart showing examples of the liquid crystal applied voltage waveforms used for a second embodiment of the liquid crystal display apparatus according to the present invention.

On the other hand, in the case of the second mode (multi-gradation representation), as shown in FIG. 9, two mutually adjacent scanning electrodes 105 are set to the scanning select status at the same time together in such a way as to be shifted two scanning electrodes by two scanning electrodes in sequence during two scanning select periods. This embodiment is particularly suitable for when pictures of a TV put on sale (whose number of the scanning lines is about half of the number of the scanning lines of images of a personal computer, for instance) is displayed in the second mode. In this case, although the ratio of the two numbers of the scanning lines is not ½ accurately, the difference between the two can be of course adjusted during the vertical blanking period easily.

In the second embodiment of the display crystal display apparatus according to the present invention constructed as described above, since average voltages during N=2 scanning select periods can be applied to each pixel, the gradation representation can be realized by these averaged values. In addition, the two mode pictures or images composed of two different numbers of scanning lines can be displayed by switching the same liquid crystal display apparatus.

(Third embodiment)

The features of this third embodiment is to modify the circuit construction of the scanning data generating circuit 207, the scanning driver circuit 102, the video signal data generating circuit 206 and the signal driver circuit 103 of the second embodiment so as to correspond to M=N=3. The structure and the function of the other sections are the same as with the case of the first and second embodiments. Further, the same reference numerals have been retained for the similar elements which have the same functions as with the case of the first and second embodiments, in the description of this third embodiment and in FIG. 10 for brevity.

In this third embodiment of the liquid crystal display apparatus, the first mode display can be executed by the liquid crystal application voltage quite the same as with the case of the first embodiment.

Figure 10:
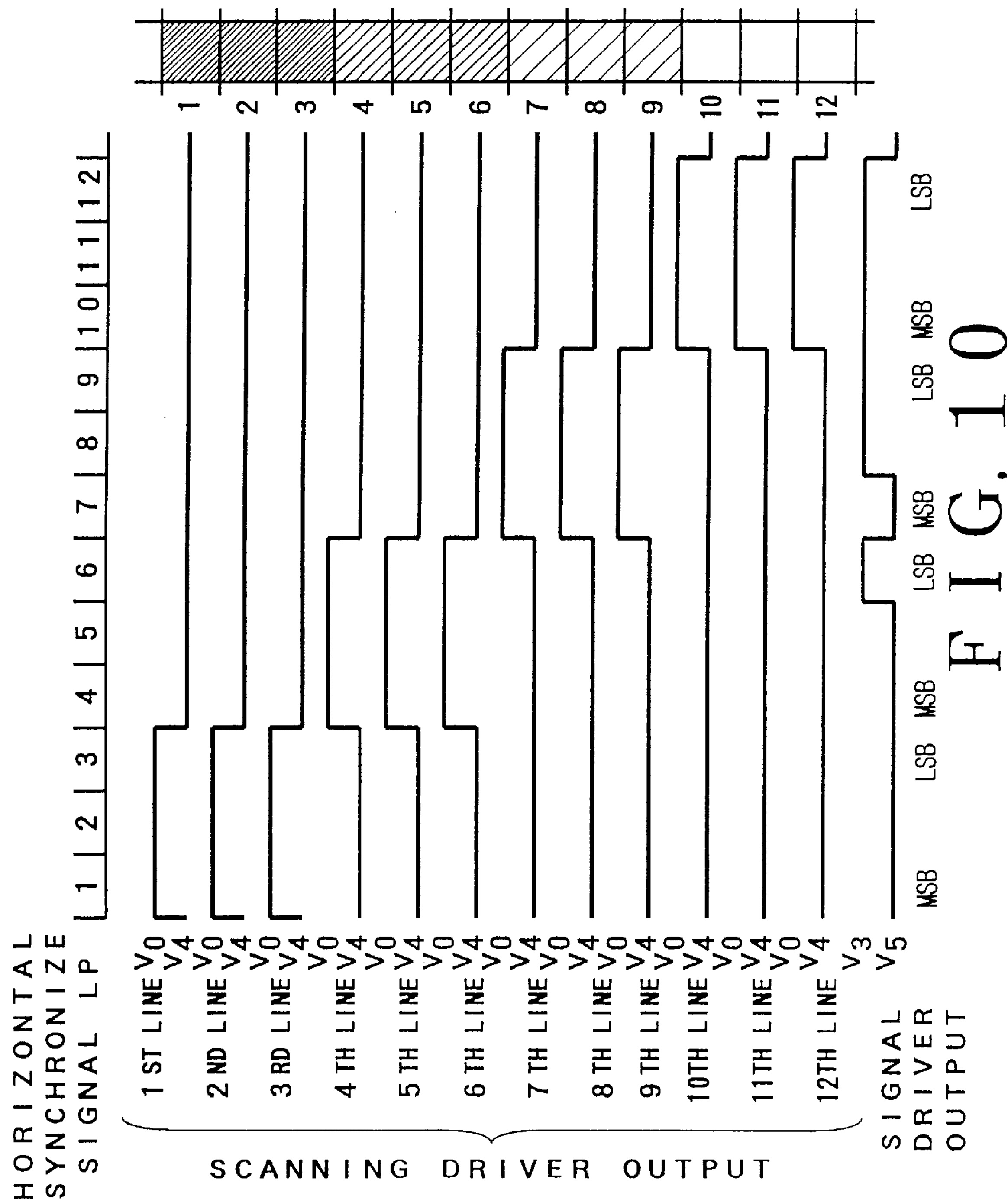
FIG. 10 is a timing chart showing examples of the liquid crystal applied voltage waveforms used for a third embodiment of the liquid crystal display apparatus according to the present invention.

On the other hand, in the case of the second mode (multi-gradation representation), as shown in FIG. 10, three mutually adjacent scanning electrodes 105 are set to the scanning select status at the same time together so as to be shifted three scanning electrodes by three scanning electrodes in sequence during three scanning select periods.

This embodiment is particularly suitable for when pictures of a TV put on sale (whose number of the scanning lines is about 1/3 of the number of the scanning lines of the high definition picture such as computer graphics (CG), for instance) is displayed in the second mode. In this case, although the ratio of the two numbers of the scanning lines is not 1/3 accurately, the difference between the two can be of course adjusted during the vertical blanking period easily.

In the third embodiment of the display crystal display apparatus according to the present invention constructed as described above, since average voltages during N=3 scanning select periods can be applied to each pixel, the gradation representation can be realized by these averaged values. In addition, the two mode pictures composed of two different numbers of scanning lines can be displayed by switching the same liquid crystal display apparatus.

Further, when the potential division ratios by the internal R1, R2 and R3 of the ADC circuit 203 as shown in FIG. 1 in the first embodiment are so adjusted as to fit to γ

(sharpness of the electric and optical curves) of the liquid crystal used for the liquid crystal display element 101 and further when the M is set to three or more (e.g., 4, 5, 6. ,,) it is possible to realize a higher gradation representation in the second mode, as compared with that of the second embodiment.

(Fourth embodiment)

Figure 11:
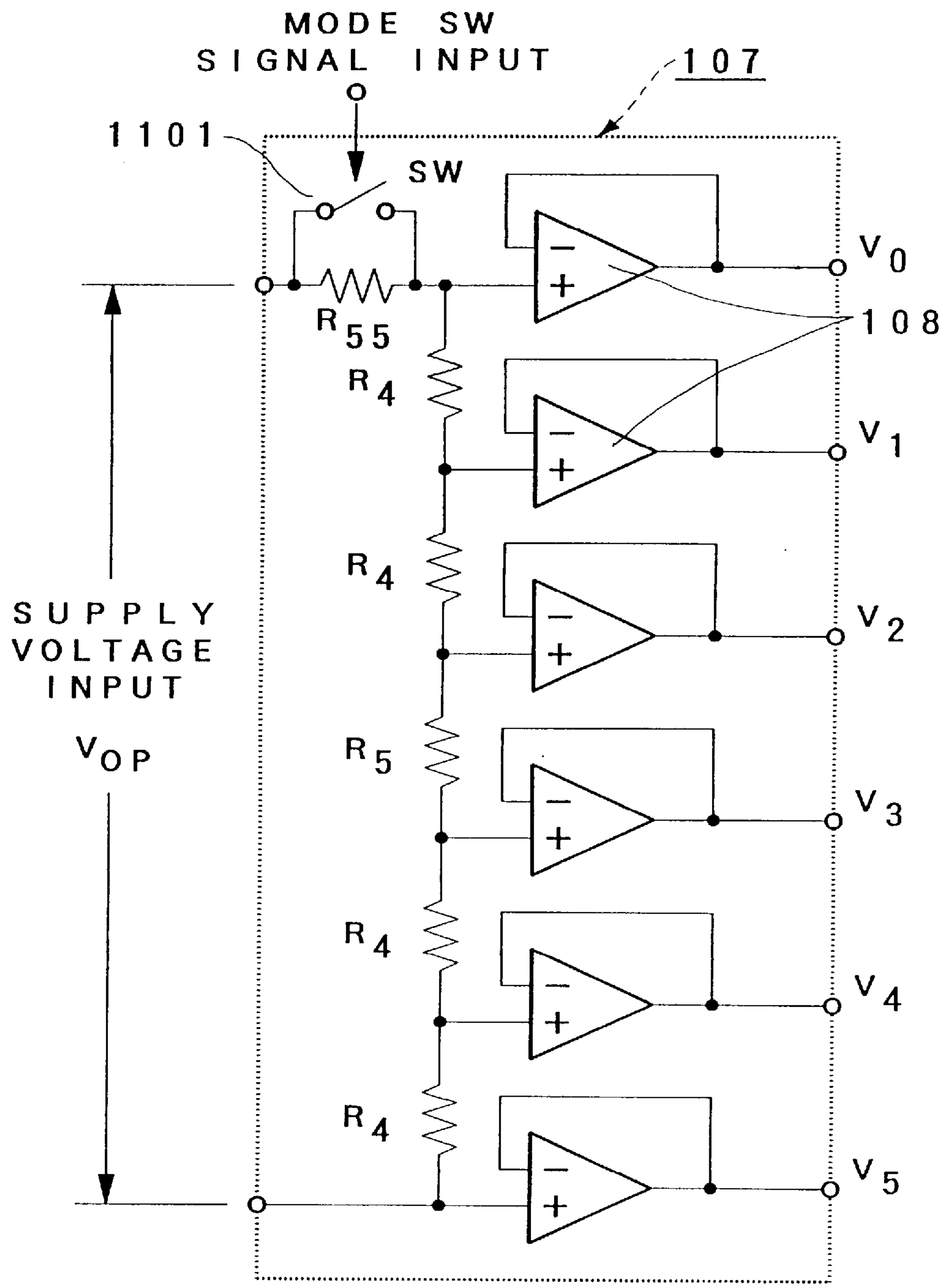
FIG. 11 is a circuit diagram showing liquid crystal drive voltage generating circuit used for a fourth embodiment of the liquid crystal display apparatus.

This fourth embodiment is different from the first embodiment of the liquid crystal display drive voltage generating circuit 107 in that a voltage switch 1101 and an electric resistor R55 are additionally provided in the liquid crystal drive voltage generating circuit 107, as shown in FIG. 11. This switch 1101 is used to bias the liquid crystal drive voltage generating circuit 107 directly (without passing through the electric resistor R55) in the first mode or indirectly (passing through the resistor R55) in the second mode. The construction and function other than the above are the same as with the case of the first embodiment. Therefore, the features of this fourth embodiment is that the amplitude of the liquid crystal application voltage is switched for each mode by switching the voltage switch 1101. Further, the same reference numerals have been retained for the similar elements which have the same functions as with the case of the first embodiment, in the description of this third embodiment and in FIG. 11 for brevity.

To this voltage switch 1101, a mode switch signal the same as that inputted to the mode switch circuit 205 is inputted. When the first mode is selected, the mode switch signal is inputted to the voltage switch 1101, so that the voltage switch 1101 is switched on to directly apply the supply voltage $V_{OP}$ to the potential dividing circuit.

On the other hand, when the second mode is selected, the voltage switch 1101 is switched off to indirectly apply the supply voltage $V_{OP}$ to the potential dividing circuit via the electric resistor R55. Therefore, in the second mode, voltages lowered by the electric resistor R55 are outputted from the rear-stage potential dividing circuits. In other words, in the second mode, the voltage amplitudes outputted from the liquid crystal drive voltage generating circuit 107 are lower that those outputted in the first mode.

As described above, when the amplitude of the liquid crystal application voltage can be switched according to the mode, the maximum amplitude of the liquid crystal application voltage in the second mode can be lowered below that in the first mode, so that it is possible to equalize the luminance characteristics of the picture or image displayed in both modes.

Further, it is of course possible to apply the technique of the fourth embodiment (the amplitude of the liquid crystal application voltage is controlled according to each mode) to the second and third embodiments of the liquid crystal display apparatus according to the present invention, without being limited to only the first embodiment.

(Fifth embodiment)

Figure 12:
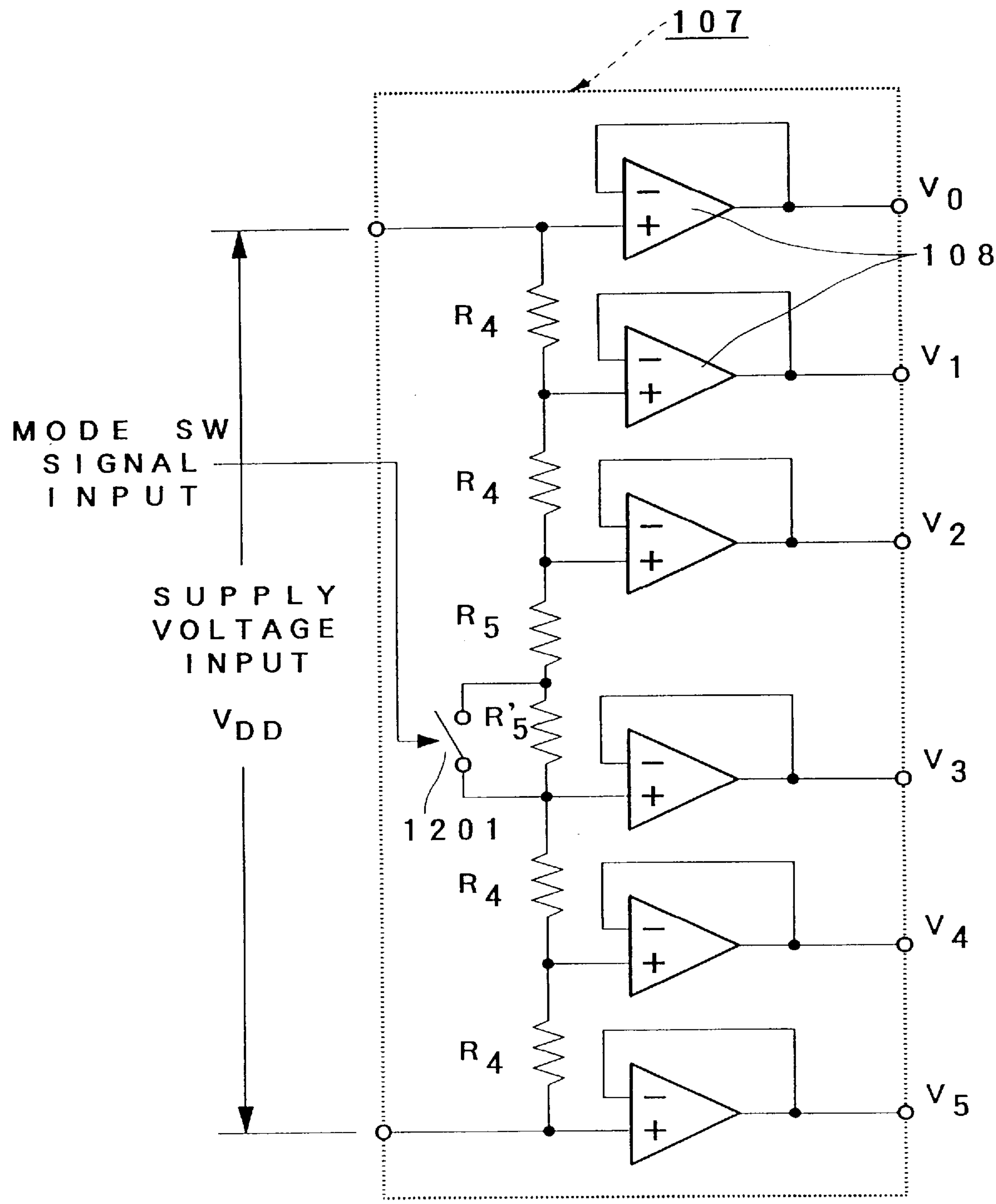
FIG. 12 is a circuit diagram showing liquid crystal drive voltage generating circuit used for a fifth embodiment of the liquid crystal display apparatus.

This fifth embodiment is different from the first embodiment of the liquid crystal display drive voltage generating circuit 107 in that a potential divide switch 1201 and an electric resistor R5' are additionally provided in the liquid crystal drive voltage generating circuit 107, as shown in FIG. 12. The electric resistor R5' is provided in the potential dividing circuit of the liquid crystal drive voltage generating circuit 107, and this potential divide switch 1201 is used to connect the electric resistor R5' to the electric resistor R5 in series or to short R5' without connecting R5' to R5. The construction and function other than the above are the same as with the case of the first embodiment. Therefore, the features of this fifth embodiment is that the bias ratios of the liquid crystal application voltages can be switched to different amplitude for each mode by activating the potential divide switch 1201. Further, the same reference numerals have been retained for the similar elements which have the same functions as with the case of the first embodiment, in the description of this fifth embodiment and in FIG. 12 for brevity.

To this potential divide switch 1201, a mode switch signal the same as that inputted to the mode switch circuit 205 is inputted. When the first mode is selected, the mode switch signal is inputted to this potential divide switch 1201, so that the potential divide switch 1201 is switched on. Therefore, the supply voltage $V_{DD}$ bypasses the electric resistor R5', so that the voltage is divided by R5 between the two output terminals V2 and V3 in the same way as with the cases of the first to fourth embodiments. The bias ratio of the liquid crystal application voltage outputted by the liquid crystal drive voltage generating circuit 107 in the first mode is 1/17.

On the other hand, when the second mode is selected, the potential divide switch 1201 is switched off, so that the supply voltage $V_{DD}$ is divided by the two electric resistors R5 and R5' between the output terminals V2 and V3. Therefore, in the second mode, voltages of lower bias ratios are outputted from lower than those in the first mode are outputted from the liquid crystal drive voltage generating circuit 107. In this fifth embodiment, the bias ratio of the liquid crystal application voltage outputted by the liquid crystal drive voltage generating circuit 107 in the second mode is 1/33.

As described above, since the bias ratio of the liquid crystal application voltages is switched according to the mode; that is, the bias ratio of the second mode is set lower than that of the first mode, it is possible to equalize the luminance characteristics and the contrast characteristics of the pictures displayed in both modes.

Further, it is of course possible to apply the technique of the fifth embodiment (the bias ratio of the liquid crystal application voltage is changed according to each mode) to the second to fourth embodiments of the crystal display apparatus, without being limited to only the first embodiment.

(Sixth embodiment)

In the sixth embodiment of the liquid crystal display apparatus according to the present invention, an electric resistance R6 and a bias voltage switch 1301 (shown in FIG. 13) are added to the fifth embodiment of the liquid crystal drive voltage generating circuit 107 shown in FIG. 12, so that the liquid crystal drive voltage generating circuit 107 of this embodiment can output the liquid crystal application voltage such that the bias ratio is $1/(L^{1/2}+1)$ in the first mode and $1/\{(L/M^{1/2})+1\}$ in the second modem where L denotes the number of canning lines.

By setting the bias ratios as described above, it is possible to maximize the ratio Vs/Vns (where Vs: the effective voltage value for turning on the liquid crystal element and Vns: the effective voltage value for turning off the liquid crystal element) in the first and second modes, respectively. Therefore, when the bias ratios are set as described above, it is possible to obtain the maximum contrast and luminance in each mode. Here, in the actual liquid crystal display apparatus, it is practically effective to set the theoretical value thereof within ±45% as the central value.

Further, in this embodiment, the bias ratio of the liquid crystal application voltage in the first mode is determined as $1/b=1/21$ so that the maximum contrast can be obtained in accordance with the above-mentioned theoretical expression of when the number of the scanning lines is L=240. Further, the bias ratio of the liquid crystal application voltage in the second mode is determined as 1/b=1/12.5.

As described above, when the optimum bias ratio is set for each mode, it is possible to obtain higher quality picture of excellent contrast characteristics in both the first and second modes, as compared with the first to fourth embodiments of the liquid crustal display apparatus.

In the liquid crystal display apparatus according to the present invention, the basis ratio is determined so that the maximum contrast ratio can be obtained in both the first and second modes, respectively by taking into account that the substantial number of the scanning lines in the first mode to the second mode is L/M. FIGS. 7 and 4 show the liquid crystal drive voltage generating circuit 107 of the sixth embodiment. This circuit shown in FIGS. 7 and 4 is provided with a function for changing the bias ratio in response to the mode switch signal. The respective voltage levels V0 to V5 can be obtained by dividing the liquid crystal drive voltage $V_{OP}$ by use of the resistors. The bias ratio can be decided by the two resistors R3 and R3' connected between V2 and V3. In this sixth embodiment, the two bias ratios can be obtained by a control transistor SW2 turned on or off in response to the mode switch signal. In response to the second mode switch signal, the transistor switch SW2 is turned on to short the resistor R3, so that the voltage divide ratio is decided between V2 and V3 by only the resistor R3 to obtain the maximum bias ration $1/\{(L/M)^{1/2}\}$. On the other hand, in response to the first mode switch signal, the transistor switch is turned on to short the resistor R3', so that only resistor R3 exists substantially between V2 and V3. As a result, the voltage divide ratio is set at the maximum bias ration $1/(L/1)^{1/2}$.

Further, when the liquid crystal drive voltage is set as described above, since both Vs and Vn in the second mode become larger than those in the first mode, the liquid crystal drive voltage generating circuit 107 is provided with an additional function for switching the magnitude of $V_{OP}$ by use of resistance R5 and a first control switch SW1 turned on or off in response to the mode switch signal. That is, in the first mode, the first switch SW is turned on to increase the $V_{OP}$. Further, in the second mode, the first switch SW is turned off to decrease the $V_{OP}$.

(Seventh embodiment)

In the above description, the whole image or picture is displayed only in the first mode or the second mode. Without being limited only thereto, it is possible to mix the first and second modes on the same signal display screen.

Figure 14:
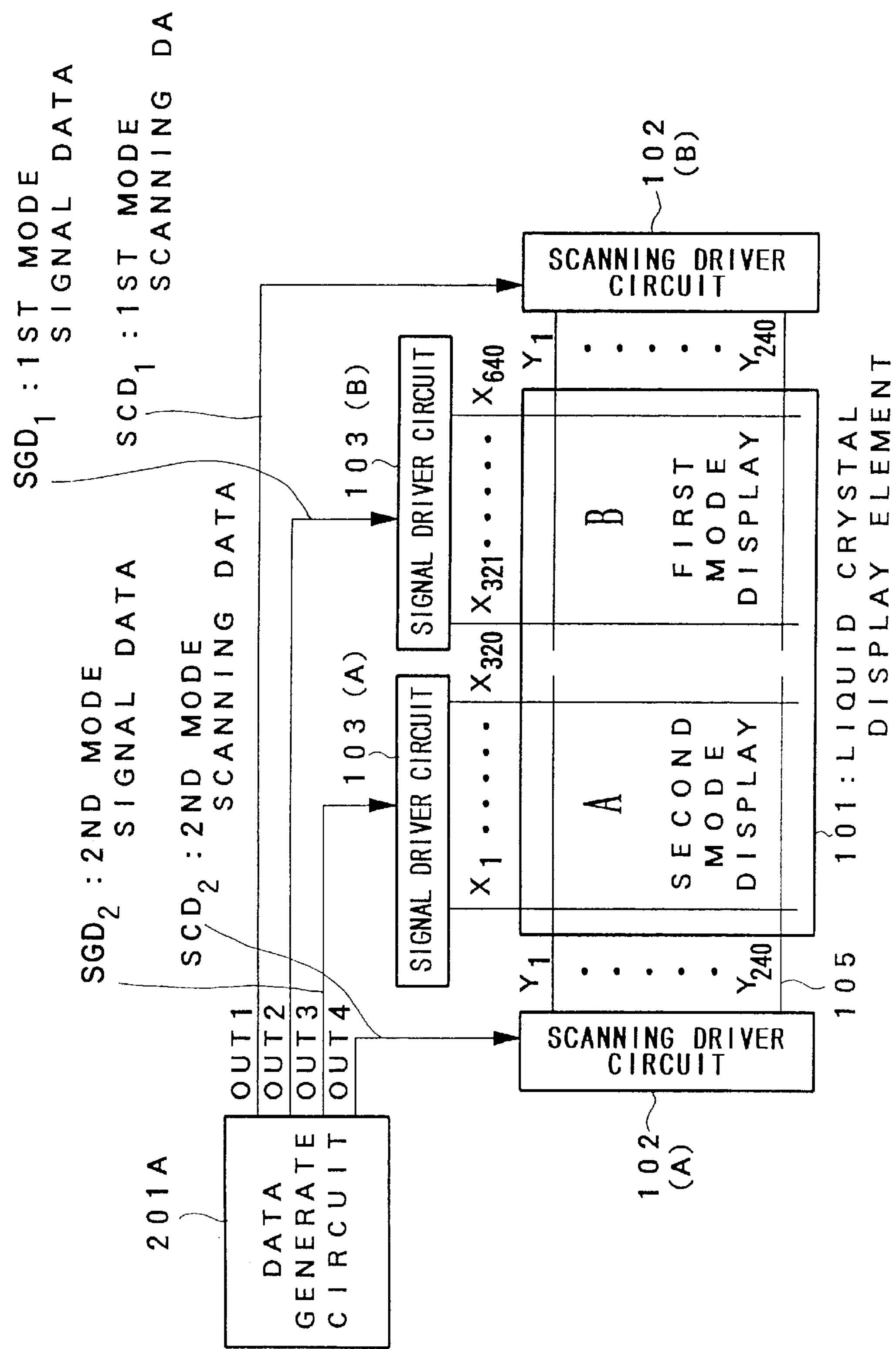
FIG. 14 is a circuit diagram showing an essential portion of the liquid crystal display apparatus of the seventh embodiment.

FIG. 14 shows the case where the left side area A of the liquid crystal display element 101 is displayed in the second mode and the right side area B of the liquid crystal display element 101 is displayed in the first mode. In this case, the canning driver circuit 102(A) and the signal driver circuit 103(A) are provided for the left side area A; and the canning driver circuit 102(B) and the signal driver circuit 103(B) are provided for the right side area B. Further, the second mode scanning data $SCD_2$ and the second mode signal data $SGD_2$ are applied from the data generating circuit 201A to the scanning driver circuit 102(A) and the signal driver circuit 103(A), respectively. Further, the first mode scanning data $SCD_1$ and the first mode signal data $SGD_1$ are applied from the data generating circuit 201A to the scanning driver circuit 102(B) and the signal driver circuit 103(B), respectively. Accordingly, it is possible to display the left side area A in the second mode and the right side area B in the first mode on the same liquid crystal element 101.

Further, it is also possible to display the left side area A in the first mode and the right side area B in the second mode by outputting appropriate data from the data generating circuit 201A.

Figure 15:
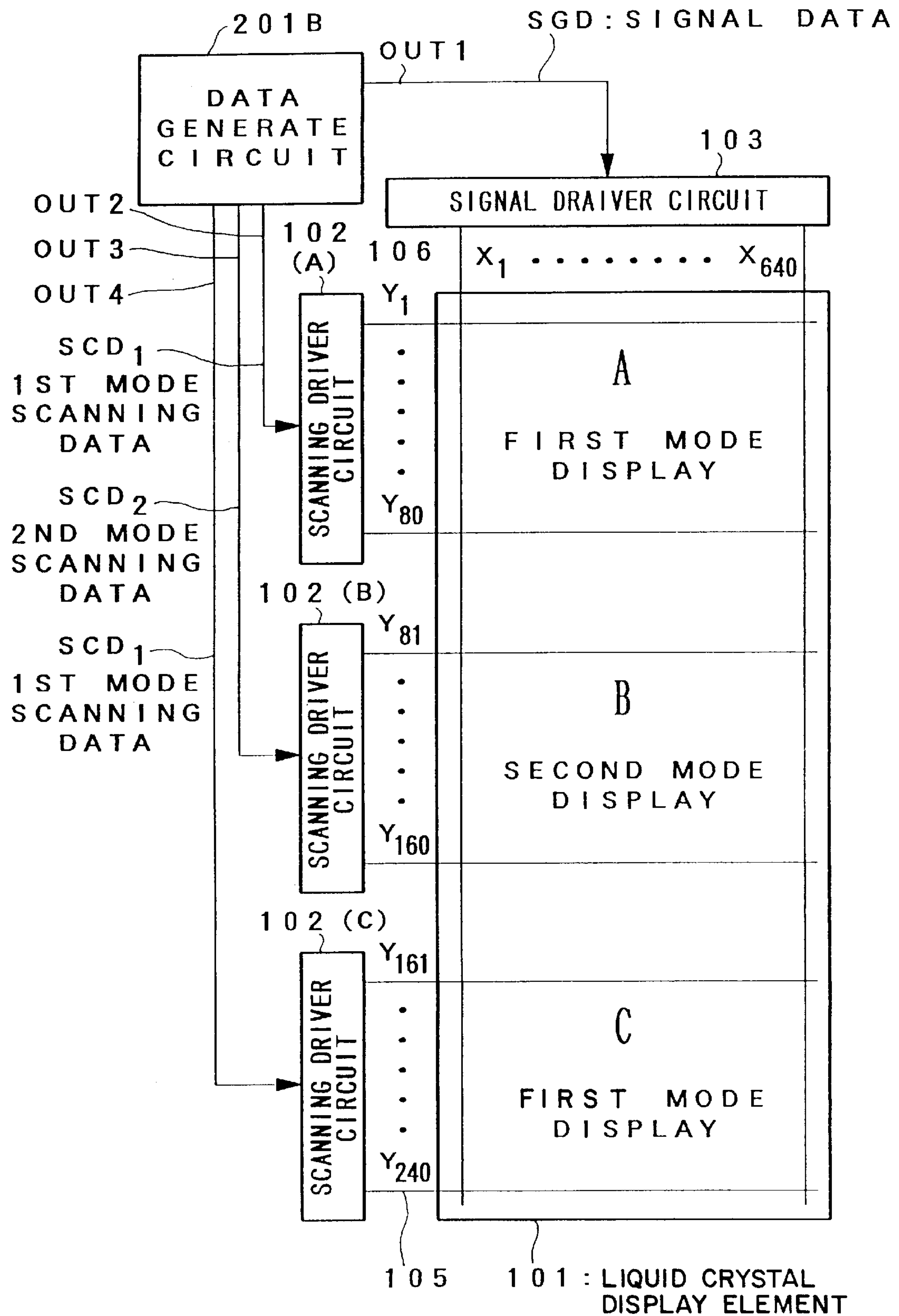
FIG. 15 is a circuit diagram showing an essential portion of the liquid crystal display apparatus of a modification of the seventh embodiment.

FIG. 15 shows another example where the upper and lower areas A and C are displayed in the first mode and the middle area B is displayed in the second mode in the same liquid crystal display element 101.

In this example, one signal driver circuit 103 is provided for the whole liquid crystal display element 1, and further three scanning driver circuits 102(A), 102(B) and 102(C) are provided in correspondence to the upper, middle and lower areas A, B and C, respectively. Further, the signal data SGD, and first and second mode scanning data $SCD_1$, $SCD_2$, $SCD_1$ are applied from the data generating circuit 201B to the signal driver 103, and the scanning driver circuits 102(A) to 102(C), respectively. Accordingly, it is possible to display the upper and lower side areas A and C in the first mode and the middle area B in the second mode, respectively.

Further, in FIG. 15, the middle area B of the liquid crystal display element 101 is displayed in the second mode. However, it is possible to display the second mode in both the upper and lower side areas A and C and the first mode in the middle area thereof. As described above, it is possible to display any partitioned area in any of the first and second modes, according to the desired modifications.

Figure 16:
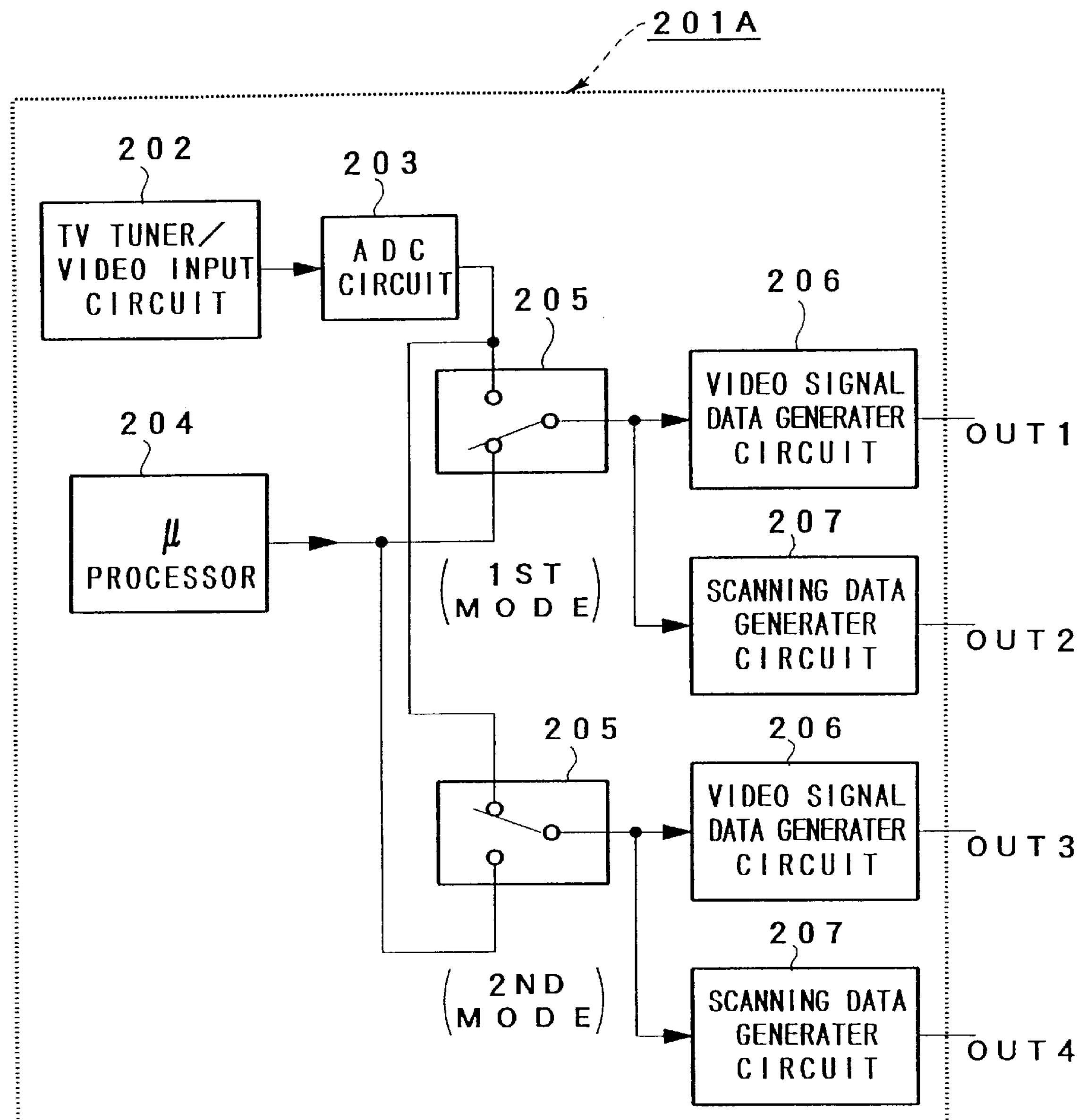
FIG. 16 is a circuit diagram showing an example of the data generating circuit shown in FIG. 14.
Figure 17:
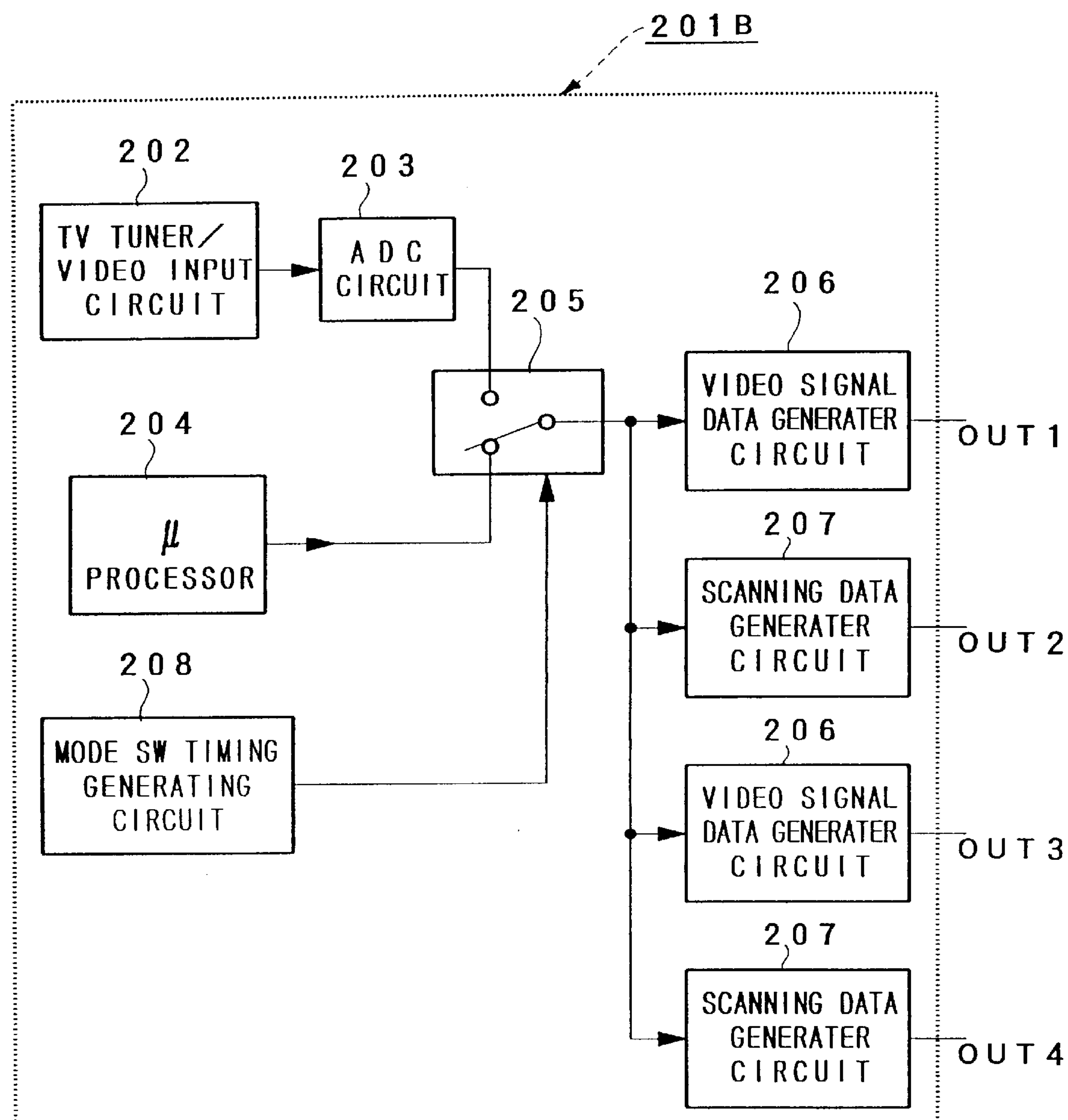
FIG. 17 is a circuit diagram showing an example of the data generating circuit shown in FIG. 15.

The data generating circuits 201A and 201B shown in FIGS. 14 and 15 are shown in more detail in FIGS. 16 and 17, respectively.

In FIG. 17, in particular, the data generating circuit 201B includes a mode switch timing generating circuit 208. Therefore, in this timing generating circuit 208, whenever the mode switch circuit 205 is changed over, it is possible *to output the first, second and first mode scanning data $SCD_1$, $SCD_2$, and $SCD_1$ from the outputs OUT2, OUT3 and OUT4, respectively, for instance as shown in FIG. 15. Accordingly, it is possible to display the areas A, B and C in the first, second and first modes, respectively.

As described above, in the seventh embodiment according to the present invention, it is possible to mix the first and second mode displays both right and left or both upper and lower, in addition to the whole same mode display.

The embodiments of the present invention have been described by taking the case of the liquid crystal display element, without being limited only thereto, however, it is possible to apply the present invention to drive or light up the other display elements such as EL (electroluminescence device or plasma display, etc.

As described above, in the liquid crystal display apparatus according to the present invention, the apparatus is provided with two functions for realizing the first mode in which images of computer character outputs (e.g., characters, numerical, etc.) can be displayed and the second mode in which TV pictures can be displayed. In the second mode, multi-gradation representation picture can be displayed extremely smoothly without generating flickers.

We claim:

1. A liquid crystal display apparatus, comprising:

a plurality of scanning electrodes extending in a first direction, scanning voltage and non-scanning voltage being selectively applied thereto;

a plurality of signal electrodes extending in a second direction perpendicular to the first direction, first signal voltages and second signal voltages being selectively applied thereto;

a liquid crystal layer sandwiched between said scanning electrodes and said signal electrodes;

mode switching means for switching between a first mode in which an image is displayed by two-gradation pixels and a second mode in which a picture is displayed by three or more gradation pixels;

scanning voltage applying means for selectively applying the scanning voltage and the non-scanning voltage to said scanning electrodes; in the first mode, the scanning voltage being applied to a plurality of said scanning electrodes one by one in sequence only during a first period of time; and in the second mode, the scanning voltage being applied to M-lines, M being an integer, of a plurality of said scanning electrodes simultaneously in sequence during a second period of time M-times longer than the first period; and signal voltage applying means for selectively applying a first signal voltage and a second signal voltage to said signal electrodes; during first mode operation, pixels at which the selected line of said scanning electrodes and the signal electrodes intersecting each other being displayed corresponding to the signal voltage applied thereto during the first period; and during second mode operation, where M-lines of said adjacent continuous scanning electrodes are selected simultaneously in the second period,pixels at which the selected M-lines of said scanning electrodes and the signal electrode intersecting each other being displayed in a density corresponding to an average voltage of all the signal voltages selected from the first and second signal voltages and applied to the signal electrode in every first periods constituting the second period, the signal voltages being variable during the second period.

2. The liquid crystal display apparatus of claim 1, wherein to select the M-lines scanning electrodes from a plurality of said scanning electrodes and to apply the scanning voltage to said selected scanning electrodes, said scanning voltage applying means selects first M-lines of said scanning electrodes during the first second-period, and then second M-lines of said scanning electrodes only during the succeeding second second-period, without being overlapped with the first second-period, in such a way that non-overlapped selection operation is repeated in sequence to apply the scanning voltage to the M-lines of said selected scanning electrodes, respectively.

3. The liquid crystal display apparatus of claim 1, wherein the first period is a horizontal scanning period for applying the scanning voltage to said single scanning electrode, for displaying a picture.

4. The liquid crystal display apparatus of claim 2, wherein M is two, and a picture is displayed by three-gradation pixels in the second mode.

5. The liquid crystal display apparatus of claim 2, wherein M is three, and a picture is displayed by four-gradation pixels in the second mode.

6. The liquid crystal display apparatus of claim 1, wherein to select M-lines of said scanning electrodes from a plurality of said scanning electrodes and to apply the scanning voltage to said selected scanning electrodes, said scanning voltage applying means selects first M-lines of said scanning electrodes only during the first second-period, and then second M-lines of said scanning electrodes only during the second second-period, beginning from the middle of the first second-period and being overlapped with one another during the fist second-period, in such a way that partially overlapped selection operation is repeated in sequence to apply the scanning voltage to the M-lines of said selected scanning electrodes, respectively.

7. The liquid crystal display apparatus of claim 6, wherein M is four, and a picture can be displayed by five-gradation pixels in the second mode.

8. The liquid crystal display apparatus of claim 1, wherein the first signal voltage value determined in the second mode is decided lower than the first signal voltage value determined in the first mode, to display a picture by multi-gradation pixels in the second mode.

9. The liquid crystal display apparatus of claim 2, wherein the first signal voltage value determined in the second mode is decided lower than the first signal voltage value determined in the first mode, to display a picture by multi-gradation pixels in the second mode.

10. The liquid crystal display apparatus of claim 6, wherein the first signal voltage value determined in the second mode is decided lower than the first signal voltage value determined in the first mode, to display a picture by multi-gradation pixels in the second mode.

11. The liquid crystal display apparatus of claim 1, wherein when the second mode is selected, a bias ratio $\{B/(A+B)\}$ of the scanning voltage value A to the first signal voltage value B is changed simultaneously when the mode is switched between the first and second modes; and the bias ratio obtained in the second mode is determined to be smaller than the bias ratio obtained in the first mode.

12. The liquid crystal display apparatus of claim 2, wherein when the second mode is selected, a bias ratio $\{B/(A+B)\}$ of the scanning voltage value A to the first signal voltage value B is changed simultaneously when the mode is switched between the first and second modes; and the bias ratio obtained in the second mode is determined to be smaller than the bias ratio obtained in the first mode.

13. The liquid crystal display apparatus of claim 6, wherein when the second mode is selected, a bias ratio $\{B/(A+B)\}$ of the scanning voltage value A to the first signal voltage value B is changed simultaneously when the mode is switched between the first and second modes; and the bias ratio obtained in the second mode is determined to be smaller than the bias ratio obtained in the first mode.

14. The liquid crystal display apparatus of claim 1, wherein when the second mode is selected, a bias ratio $\{B/(A+B)\}$ of the scanning voltage value A to the first signal voltage value B is changed simultaneously when mode is switched between the first and second modes; and when the first mode is selected, the bias ratio is set with $1/(L^{1/2}+1)$ as its center, and when the second mode is selected the bias ratio is set with $1/\{(L/M)^{1/2}+1\}$ as its center, where L denotes the total number of the scanning electrodes.

15. The liquid crystal display apparatus of claim 2, wherein when the second mode is selected, a bias ratio $\{B/(A+B)\}$ of the scanning voltage value A to the first signal voltage value B is changed simultaneously when mode is switched between the first and second modes; and when the first mode is selected, the bias ratio is set with $1/\{L^{1/2}+1\}$ as its center, and when the second mode is selected the bias ratio is set with $1/\{(L/M)^{1/2}+1\}$ as its center, where L denotes the total number of the scanning electrodes.

16. The liquid crystal display apparatus of claim 6, wherein when the second mode is selected, a bias ratio $\{B/(A+B)\}$ of the scanning voltage value A to the first signal voltage value B is changed simultaneously when mode is switched between the first and second modes; and when the first mode is selected, the bias ratio is set with $1/(L^{1/2}+1)$ as its center, and when the second mode is selected the bias ratio is set with $1/\{(L/M)^{1/2}+1\}$ as its center, where L denotes the total number of the scanning electrodes.

17. The liquid crystal display apparatus of claim 14, wherein when the first mode is selected, the bias ratio is set within a tolerance of ±45% with $1/(L^{1/2}+1)$ as its center, and when the second mode is selected the bias ratio is set within a tolerance of ±45% with $1/\{(L/M)^{1/2}+1\}$ as its center.

18. The liquid crystal display apparatus of claim 15, wherein when the first mode is selected, the bias ratio is set within a tolerance of ±45% with $1/(L^{1/2}+1)$ as its center, and when the second mode is selected the bias ratio is set within a tolerance of ±45% with $1/\{(L/M)^{1/2}+1\}$ as its center.

19. The liquid crystal display apparatus of claim 16, wherein when the first mode is selected, the bias ratio is set within a tolerance of ±45% with $1/(L^{1/2}+1)$ as its center, and when the second mode is selected the bias ratio is set within a tolerance of ±45% with $1/\{(L/M)^{1/2}+1\}$ as its center.

20. The liquid crystal display apparatus of claim 1, wherein a display screen of a liquid crystal display element formed by said scanning electrodes, said drive electrodes and said liquid crystal layer is partitioned into a plurality of display areas; each of the partitioned display areas is provided with said scanning voltage applying means and said signal voltage applying means both corresponding to each display area; and each of the partitioned display areas displays a picture in any one of the first and second modes.

21. The liquid crystal display apparatus of claim 2, wherein a display screen of a liquid crystal display element formed by said scanning electrodes, said drive electrodes and said liquid crystal layer is partitioned into a plurality of display areas; each of the partitioned display areas is provided with said scanning voltage applying means and said signal voltage applying means both corresponding to each display area; and each of the partitioned display areas displays a picture in any one of the first and second modes.

22. The liquid crystal display apparatus of claim 6, wherein a display screen of a liquid crystal display element formed by said scanning electrodes, said drive electrodes and said liquid crystal layer is partitioned into a plurality of display areas; each of the partitioned display areas is provided with said scanning voltage applying means and said signal voltage applying means both corresponding to each display area; and each of the partitioned display areas displays a picture in any one of the first and second modes.

23. The liquid crystal display apparatus of claim 20, wherein a single scanning electrode extending in the first direction is separated into a plurality of scanning electrode pieces; said scanning voltage applying means and said signal voltage applying means are provided for each group of the scanning electrode pieces arranged in the second direction; and a picture is displayed in any of the first and second modes for each display area corresponding to the group of the scanning electrode pieces.

24. The liquid crystal display apparatus of claim 21, wherein a single scanning electrode extending in the first direction is separated into a plurality of scanning electrode pieces; said scanning voltage applying means and said signal voltage applying means are provided for each group of the scanning electrode pieces arranged in the second direction; and a picture is displayed in any of the first and second modes for each display area corresponding to the group of the scanning electrode pieces.

25. The liquid crystal display apparatus of claim 22, wherein a single scanning electrode extending in the first direction is separated into a plurality of scanning electrode pieces; said scanning voltage applying means and said signal voltage applying means are provided for each group of the scanning electrode pieces arranged in the second direction; and a picture is displayed in any of the first and second modes for each display area corresponding to the group of the scanning electrode pieces.

26. The liquid crystal display apparatus of claim 20, wherein a predetermined number of said scanning electrodes forms a single block, respectively; said scanning voltage applying means is provided in correspondence to each block; and said signal voltage applying means being able to apply signals to the selected scanning electrodes to display a picture in the corresponding first or second mode, so that a picture is displayed in any of the first and second modes for each display area corresponding to each block.

27. The liquid crystal display apparatus of claim 21, wherein a predetermined number of said scanning electrodes forms a single block, respectively; said scanning voltage applying means is provided in correspondence to each block; and said signal voltage applying means being able to apply signals to the selected scanning electrodes to display a picture in the corresponding first or second mode, so that a picture is displayed in any of the first and second modes for each display area corresponding to each block.

28. The liquid crystal display apparatus of claim 22, wherein a predetermined number of said scanning electrodes forms a single block, respectively; said scanning voltage applying means is provided in correspondence to each block; and said signal voltage applying means being able to apply signals to the selected scanning picture in to display a picture in the corresponding first or second mode, so that a picture is displayed in any of the first and second modes for each display area corresponding to each block.

* * * * *